United States Patent
Schneider

(10) Patent No.: US 10,382,769 B2
(45) Date of Patent: Aug. 13, 2019

(54) REAL-TIME LOSSLESS COMPRESSION OF DEPTH STREAMS

(71) Applicant: KING ABDULLAH UNIVERSITY OF SCIENCE AND TECHNOLOGY, Thuwal (SA)

(72) Inventor: Jens Schneider, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 199 days.

(21) Appl. No.: 15/433,114

(22) Filed: Feb. 15, 2017

(65) Prior Publication Data

US 2017/0237996 A1     Aug. 17, 2017

Related U.S. Application Data

(60) Provisional application No. 62/295,235, filed on Feb. 15, 2016.

(51) Int. Cl.
| | |
|---|---|
| *G06K 9/46* | (2006.01) |
| *H04N 19/184* | (2014.01) |
| *H04N 19/132* | (2014.01) |
| *H04N 19/13* | (2014.01) |
| *H04N 13/161* | (2018.01) |
| *G06T 9/00* | (2006.01) |

(Continued)

(52) U.S. Cl.
CPC ............ *H04N 19/184* (2014.11); *G06T 9/00* (2013.01); *G06T 9/005* (2013.01); *H04N 13/161* (2018.05); *H04N 19/13* (2014.11); *H04N 19/132* (2014.11); *H04N 19/593* (2014.11); *H04N 19/597* (2014.11); *H04N 19/93* (2014.11)

(58) Field of Classification Search
CPC ...... H04N 19/593; H04N 19/50; H04N 19/61; G06T 7/50; G06T 7/60; G06T 9/00; G06T 5/40
See application file for complete search history.

(56) References Cited

U.S. PATENT DOCUMENTS

| | | | | |
|---|---|---|---|---|
| 5,881,176 A | * | 3/1999 | Keith .................... | G06F 17/148 375/E7.016 |
| 6,956,973 B1 | * | 10/2005 | Liang ................... | H04N 19/647 375/E7.047 |

(Continued)

*Primary Examiner* — Jayesh A Patel
(74) *Attorney, Agent, or Firm* — Patent Portfolio Builders, PLLC

(57) ABSTRACT

Various examples are provided for lossless compression of data streams. In one example, a Z-lossless (ZLS) compression method includes generating compacted depth information by condensing information of a depth image and a compressed binary representation of the depth image using histogram compaction and decorrelating the compacted depth information to produce bitplane slicing of residuals by spatial prediction. In another example, an apparatus includes imaging circuitry that can capture one or more depth images and processing circuitry that can generate compacted depth information by condensing information of a captured depth image and a compressed binary representation of the captured depth image using histogram compaction; decorrelate the compacted depth information to produce bitplane slicing of residuals by spatial prediction; and generate an output stream based upon the bitplane slicing.

18 Claims, 15 Drawing Sheets

(51) Int. Cl.
*H04N 19/597* (2014.01)
*H04N 19/593* (2014.01)
*H04N 19/93* (2014.01)

(56) References Cited

U.S. PATENT DOCUMENTS

2014/0253682 A1* 9/2014 Zhang .................. H04N 19/597
 348/43
2015/0104101 A1* 4/2015 Bryant .................... G06T 7/507
 382/171

* cited by examiner

FIG. 5A  FIG. 5B  FIG. 5C

$c \geq \max(a,b)$   $c \leq \min(a,b)$   otherwise
$\pi \leftarrow \min(a,b)$   $\pi \leftarrow \max(a,b)$   $\pi \leftarrow a+b-c$

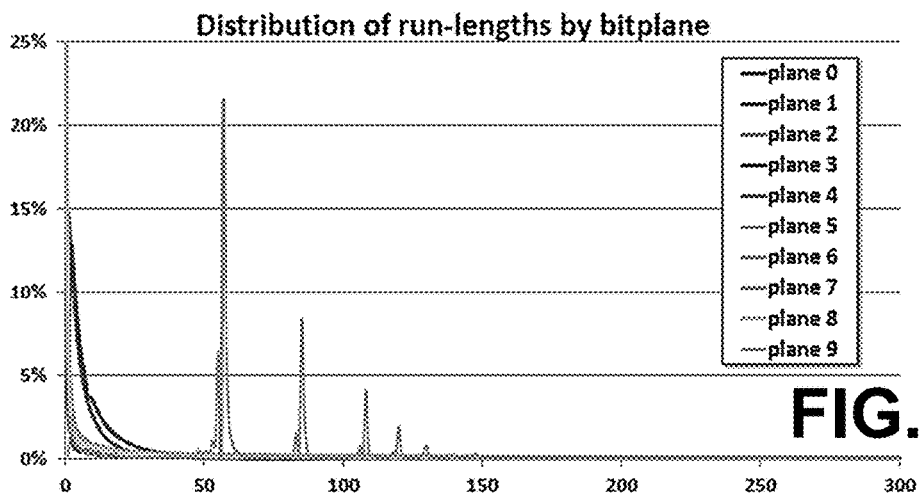

Algorithm 1: Encoding a value σ using adaptive Golomb codes.

| | |
|---|---|
| input | : Parameters $l, k_+, k_-$, symbol to encode σ |
| output | : Encoded symbol σ, updated $k, k'$ |
| initialization: $k \leftarrow l, k' \leftarrow k' - k_+$ // once | | void encode(σ)
$\quad M \leftarrow 2^k$
$\quad$ while $\sigma \geq M$ do
$\quad\quad$ // encode first $M$ of σ
$\quad\quad \sigma \leftarrow \sigma - M$
$\quad\quad$ emit($1$)
$\quad\quad$ // update parameters
$\quad\quad k' \leftarrow k' + k_+$
$\quad\quad k \leftarrow \lfloor \frac{k'}{2^l} \rfloor$
$\quad\quad M \leftarrow 2^k$
$\quad$ // emit remainder using $k+1$ bits
$\quad$ emit($0$)
$\quad$ emit(σ)
$\quad$ // update parameters
$\quad k' \leftarrow \max(0, k' - k_-)$
$\quad k \leftarrow \lfloor \frac{k'}{2^l} \rfloor$

FIG. 9B

| | Section | Size | Compression |
|---|---|---|---|
| timestamp | 3.2 | 0.0018% | linear prediction, ad. Golomb coding |
| mask | 3.5 | 0.0015% | prefix, leading bit or verbatim |
| bins | 3.3 | 0.0293% | linear prediction, ad. Golomb coding |
| 0-runs | 3.5 & 3.6 | 86.3827% | bitplane RLE, ad. Golomb coding |
| truncates | 3.5 | 13.5847% | verbatim at variable bitrate |

| Category | frames | Input size/GB | time/s | gzip size/GB | time/s | 7Zip size/GB | time/s | bzip2 size/GB | time/s | ZLS (ours) size/GB | time/s |
|---|---|---|---|---|---|---|---|---|---|---|---|
| Basement | 2'025 | 0.855 | 73.88 | 0.172 | 33 | 0.140 | 56 | 0.117 | 180 | 0.102 | 14 |
| Bathrooms | 26'553 | 11.216 | 983.11 | 2.272 | 415 | 1.767 | 707 | 1.452 | 2'242 | 1.289 | 181 |
| Bedrooms | 102'202 | 43.171 | 4'102.86 | 8.036 | 1'655 | 6.457 | 2'851 | 5.291 | 9'782 | 4.656 | 740 |
| Bookstore | 27'170 | 11.477 | 1'005.48 | 2.415 | 421 | 1.924 | 771 | 1.638 | 2'409 | 1.444 | 203 |
| Café | 1'933 | 0.817 | 70.64 | 0.142 | 30 | 0.115 | 49 | 0.097 | 176 | 0.091 | 12 |
| Classroom | 16'875 | 7.128 | 605.94 | 1.287 | 265 | 1.083 | 447 | 0.907 | 1'520 | 0.824 | 114 |
| Dining Rooms | 49'422 | 20.876 | 2'036.74 | 3.836 | 749 | 3.137 | 1'295 | 2.612 | 4'454 | 2.384 | 339 |
| Furniture Stores | 11'393 | 4.812 | 463.75 | 0.748 | 155 | 0.615 | 263 | 0.516 | 1'070 | 0.493 | 65 |
| Home Offices | 13'367 | 5.646 | 500.13 | 1.070 | 219 | 0.878 | 379 | 0.724 | 1'239 | 0.656 | 100 |
| Kitchens | 70'299 | 29.695 | 2'866.16 | 5.609 | 1'059 | 4.480 | 1'824 | 3.707 | 6'175 | 3.377 | 477 |
| Libraries | 13'501 | 5.703 | 624.08 | 1.020 | 203 | 0.829 | 347 | 0.695 | 1'246 | 0.642 | 87 |
| Living Rooms | 98'828 | 41.746 | 4'096.37 | 7.362 | 1'478 | 6.013 | 2'513 | 4.973 | 8'910 | 4.519 | 663 |
| Misc | 13'518 | 5.701 | 506.60 | 1.058 | 215 | 0.864 | 373 | 0.716 | 1'266 | 0.646 | 94 |
| Office Kitchens | 3'117 | 1.317 | 110.18 | 0.251 | 50 | 0.201 | 94 | 0.163 | 268 | 0.148 | 24 |
| Offices | 28'315 | 11.960 | 1'089.30 | 2.147 | 417 | 1.720 | 707 | 1.420 | 2'541 | 1.284 | 184 |
| Playrooms | 6'725 | 2.841 | 285.14 | 0.500 | 108 | 0.412 | 228 | 0.340 | 625 | 0.305 | 51 |
| Reception Rooms | 3'665 | 14.088 | 141.81 | 0.252 | 49 | 0.209 | 82 | 0.173 | 335 | 0.164 | 24 |
| Studies | 3'935 | 6.270 | 197.07 | 0.312 | 59 | 0.253 | 101 | 0.208 | 347 | 0.187 | 28 |
| Study Rooms | 5'454 | 2.304 | 318.49 | 0.371 | 75 | 0.312 | 131 | 0.260 | 512 | 0.250 | 35 |
| Total | 498'297 | 210.485 | 20'077.72 | 38.848 | 7'656 | 31.410 | 13'218 | 26.009 | 45'298 | 23.461 | 3'435 |

FIG. 13A

| Method | optimized for speed | | | | optimized for size | | | |
|---|---|---|---|---|---|---|---|---|
| | size/GB | enc. time | dec. time | ratio | size/GB | enc. time | dec. time | ratio |
| ZLS (ours) | 23.461 | 0:57:05 | 0:49:37 | 8.97:1 | 22.952 | 1:15:13 | 0:48:56 | 9.17:1 |
| gzip | 38.848 | 2:07:37 | 0:17:23 | 5.42:1 | 32.745 | 147:52:27 | 0:22:52 | 6.43:1 |
| 7Zip | 31.410 | 3:40:18 | 0:30:38 | 6.70:1 | 24.499 | 79:07:56 | 0:28:28 | 8.59:1 |
| bzip2 | 26.009 | 12:34:58 | 0:32:45 | 8.09:1 | 25.737 | 114:42:58 | 0:58:53 | 8.18:1 |
| LZ4 | 83.994 | 0:10:03 | 0:04:40 | 2.51:1 | 48.655 | 24:31:01 | 0:03:17 | 4.33:1 |
| LZO | 87.137 | 0:08:38 | 0:08:12 | 2.42:1 | 50.258 | 6:40:58 | 0:08:13 | 4.19:1 |
| Snappy | 85.699 | 0:12:56 | 0:06:19 | 2.46:1 | N/A | N/A | N/A | N/A |

| Category | frames | Input size/GB | time/s | gzip size/GB | time/s | 7Zip size/GB | time/s | bzip2 size/GB | time/s | ZLS (ours) size/GB | time/s |
|---|---|---|---|---|---|---|---|---|---|---|---|
| Basement | 2'025 | 0.855 | 73.88 | 0.145 | 2'296 | 0.108 | 1'200 | 0.116 | 1'639 | 0.100 | 19 |
| Bathrooms | 26'553 | 11.216 | 983.11 | 1.946 | 27'153 | 1.336 | 15'166 | 1.425 | 21'120 | 1.261 | 242 |
| Bedrooms | 102'202 | 43.171 | 4'102.86 | 6.733 | 128'182 | 5.010 | 64'024 | 5.240 | 88'509 | 4.573 | 951 |
| Bookstore | 27'170 | 11.477 | 1'005.48 | 2.057 | 26'268 | 1.463 | 16'933 | 1.616 | 22'874 | 1.408 | 271 |
| Café | 1'933 | 0.817 | 70.64 | 0.120 | 1'865 | 0.093 | 907 | 0.096 | 1'564 | 0.088 | 16 |
| Classroom | 16'875 | 7.128 | 605.94 | 1.072 | 18'197 | 0.861 | 9'365 | 0.903 | 13'759 | 0.805 | 153 |
| Dining Rooms | 49'422 | 20.876 | 2'036.74 | 3.231 | 49'140 | 2.456 | 28'160 | 2.588 | 40'891 | 2.329 | 454 |
| Furniture Stores | 11'393 | 4.812 | 463.75 | 0.625 | 9'488 | 0.493 | 5'422 | 0.513 | 9'499 | 0.479 | 90 |
| Home Offices | 13'367 | 5.646 | 500.13 | 0.901 | 14'857 | 0.684 | 8'232 | 0.718 | 11'331 | 0.641 | 132 |
| Kitchens | 70'299 | 29.695 | 2'866.16 | 4.770 | 68'388 | 3.487 | 38'506 | 3.661 | 56'967 | 3.298 | 636 |
| Libraries | 13'501 | 5.703 | 624.08 | 0.876 | 12'513 | 0.684 | 6'780 | 0.683 | 11'168 | 0.626 | 118 |
| Living Rooms | 98'828 | 41.746 | 4'096.37 | 6.173 | 104'255 | 4.736 | 54'163 | 4.931 | 80'436 | 4.423 | 865 |
| Misc | 13'518 | 5.701 | 506.60 | 0.891 | 14'837 | 0.684 | 7'632 | 0.707 | 11'219 | 0.632 | 123 |
| Office Kitchens | 3'117 | 1.317 | 110.18 | 0.212 | 3'453 | 0.156 | 1'941 | 0.162 | 2'514 | 0.145 | 29 |
| Offices | 28'315 | 11.960 | 1'089.30 | 1.803 | 31'040 | 1.343 | 15'209 | 1.405 | 22'883 | 1.258 | 239 |
| Playrooms | 6'725 | 2.841 | 285.14 | 0.416 | 7'973 | 0.325 | 4'288 | 0.337 | 5'775 | 0.299 | 62 |
| Reception Rooms | 33'351 | 14.088 | 141.91 | 0.211 | 3'435 | 0.167 | 1'892 | 0.171 | 3'051 | 0.160 | 32 |
| Studies | 14'843 | 6.270 | 197.07 | 0.263 | 4'282 | 0.196 | 2'274 | 0.206 | 3'217 | 0.183 | 36 |
| Study Rooms | 5'454 | 2.304 | 318.49 | 0.311 | 4'724 | 0.251 | 2'781 | 0.258 | 4'559 | 0.244 | 46 |
| Total | 498'297 | 210.485 | 20'077.72 | 32.745 | 532'347 | 24.499 | 284'876 | 25.737 | 412'978 | 22.953 | 4'513 |

FIG. 15

| Method | Encoder size/GB | ratio | time | Decoder time |
|---|---|---|---|---|
| ZLS | 23.461 | 8.97:1 | 0:57:15 | 0:49:37 |
| JPEG LS | 35.276 | 5.97:1 | 0:42:15 | 0:40:49 |
| Tiff | 42.432 | 4.96:1 | 3:53:50 | 1:58:29 |
| PNG$_{devIL}$ | 33.640 | 6.19:1 | 5:26:32 | 0:23:00 |
| PNG$_{crush}$ | 29.433 | 7.08:1 | >3'700 hrs | 0:23:00 |
| JPEG2000 LS | 73.488 | 2.86:1 | 47:02:24 | 34:36:14 |

FIG. 16

| Method | Encoder size/GB | ratio | time | Decoder time |
|---|---|---|---|---|
| ZLS | 23.461 | 8.97:1 | 0:57:05 | 0:49:37 |
| FFV1 | 33.778 | 6.23:1 | 1:13:30 | 0:38:08 |
| H.264 | 37.061 | 5.58:1 | 5:41:30 | 0:59:18 |

FIG. 17

| Method | | Encoder size/GB | ratio | rmse | time | Decoder time |
|---|---|---|---|---|---|---|
| Lossless | | 23.461 | 8.97:1 | 0 | 0:57:05 | 0:49:37 |
| Lossy | 1 bit | 16.155 | 13.03:1 | 0.7071 | 0:50:05 | 0:39:09 |
| | 2 bit | 10.797 | 19.49:1 | 1.2260 | 0:46:47 | 0:31:26 |
| | 3 bit | 7.269 | 28.96:1 | 2.3446 | 0:45:04 | 0:27:09 |
| FFV1 | 3 bit | 7.201 | 29.23:1 | 2.3446 | 0:59:13 | 0:09:57 |
| H.264 | 3 bit | 6.013 | 35.00:1 | 2.3446 | 2:34:37 | 0:10:05 |

FIG. 18

|       | speed   |        | size    |         |
|-------|---------|--------|---------|---------|
|       | ratio   | time/s | ratio   | time/s  |
| gzip  | 2.405:1 | 31.36  | 2.569:1 | 733.26  |
| 7Zip  | 2.932:1 | 78.86  | 3.573:1 | 886.01  |
| bzip2 | 3.709:1 | 87.07  | 4.047:1 | 1'106.60|
| jpeg LS | 4.360:1 | 12.09 | NA     | NA      |
| tif   | 2.423:1 | 42.78  | NA      | NA      |
| J2K   | 1.857:1 | 750.97 | NA      | NA      |
| ZLS   | 3.987:1 | 18.53  | 4.410:1 | 29.87   |

|       | speed   |        | size    |         |
|-------|---------|--------|---------|---------|
|       | ratio   | time/s | ratio   | time/s  |
| gzip  | 1.661:1 | 9.62   | 1.736:1 | 143.97  |
| 7Zip  | 1.960:1 | 21.52  | 2.182:1 | 242.52  |
| bzip2 | 2.202:1 | 28.27  | 2.319:1 | 354.60  |
| jpeg LS | 2.096:1 | 4.48 | NA      | NA      |
| tif   | 1.649:1 | 47.32  | NA      | NA      |
| J2K   | 1.219:1 | 395.57 | NA      | NA      |
| ZLS   | 2.090:1 | 5.78   | 2.408:1 | 10.10   |

US 10,382,769 B2

REAL-TIME LOSSLESS COMPRESSION OF DEPTH STREAMS

CROSS REFERENCE TO RELATED APPLICATIONS

This application claims priority to, and the benefit of, U.S. provisional application entitled "Real-Time Lossless Compression of Depth Streams" having Ser. No. 62/295,235, filed Feb. 15, 2016, which is hereby incorporated by reference in its entirety.

BACKGROUND

Over the past years, consumer class depth cameras have established themselves as a disruptive technology, both in computer graphics and in computer vision. Depth data can be used on its own or in combination with calibrated RGB data for a wide range of applications such as 3D reconstruction, telepresence, tracking, foreground/background separation, pose tracking, or, more general, scene understanding. Virtually all depth cameras generate large amounts of data quickly. For instance, Microsoft's™ Kinect™ generates an output stream of 640 by 480 depth samples at 30 Hz. Each sample comprises an 11 bit value. Even considering densely packed 11 bit values, this amounts to more than 100 Mbits/s.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A through 10 are images of a mobile depth recorder and applications thereof, in accordance with various embodiments of the present disclosure.

FIG. 2 is a graphical representation illustrating examples of applications of a Z-lossless (ZLS) compression scheme, in accordance with various embodiments of the present disclosure.

FIG. 3 is a graphical representation illustrating an example of the ZLS compression scheme, in accordance with various embodiments of the present disclosure.

FIG. 4 illustrates an example of temporal prediction results, in accordance with various embodiments of the present disclosure.

FIGS. 5A through 5C illustrate an example of an input depth image, initially and after reversible histogram compaction and reversible optimization, in accordance with various embodiments of the present disclosure.

FIG. 6 is a graphical illustration of a Median Edge predictor (MED), in accordance with various embodiments of the present disclosure.

FIGS. 7A and 7B illustrate an example of the prediction residuals following a two-sided geometric distribution and after mapping to unsigned integers, in accordance with various embodiments of the present disclosure.

FIG. 8 is a graphical representation of an example of bitplane slicing and 0-run finding for 3 bitplanes, in accordance with various embodiments of the present disclosure.

FIG. 9A illustrates an example of a distribution of run-lengths by bitplane, in accordance with various embodiments of the present disclosure.

FIG. 9B is an example of a fast adaptive Golomb-code, in accordance with various embodiments of the present disclosure.

FIG. 10 is a table illustrating compression methods employed for each type of data and the relative size in the output stream, in accordance with various embodiments of the present disclosure.

FIG. 11 is an example of a system that may be utilized in ZLS compression, in accordance with various embodiments of the present disclosure.

FIGS. 13A and 13B are tables summarizing speed profile results of the NYU depth dataset v2, in accordance with various embodiments of the present disclosure.

FIGS. 14A and 14B illustrate sorted distribution of compression ratios and encoding times of the NYU depth dataset v2, in accordance with various embodiments of the present disclosure.

FIG. 15 is a table summarizing size profile results of the NYU depth dataset v2, in accordance with various embodiments of the present disclosure.

FIGS. 16 through 18 include tables providing comparisons between ZLS and the standard lossless image formats, in accordance with various embodiments of the present disclosure.

DETAILED DESCRIPTION

Figure 1A:
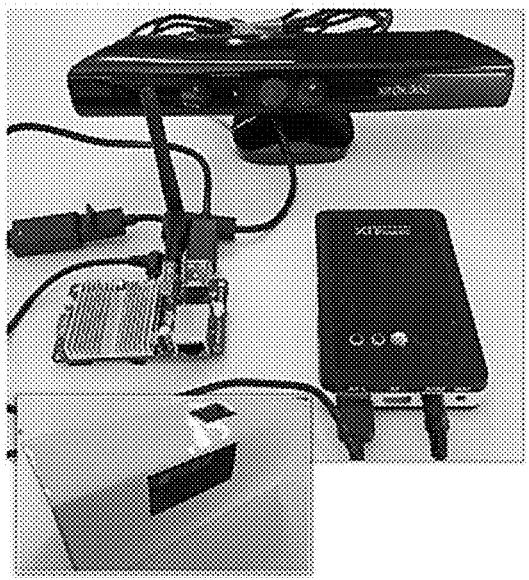

Disclosed herein are various embodiments related to lossless compression of data streams. A Z-lossless (ZLS) compression scheme is presented for depth streams. ZLS offers ultra-lightweight computational requirements and lossless compression of 9:1 for Kinect™ data. ZLS can run on a single ARM Cortex A9 core clocked at 1.7 GHz at 42 Hz, and can outperform all of its competitors (such as state-of-the-art general purpose compression, lossless image compression, and lossless video compression) in terms of compression ratio. ZLS can utilize a histogram compression module together with a customized predictor-corrector model followed by an entropy coder based on adaptive Golomb codes. ZLS can be used to stream depth data over narrow communication channels or to low-bandwidth storage devices. The computational efficiency and high compression ratios of ZLS on embedded platforms can be used to build a handheld Kinect™ camcorder and a Kinect-equipped hexa-copter, two applications that are not possible with other compression schemes. Reference will now be made in detail to the description of the embodiments as illustrated in the drawings, wherein like reference numbers indicate like parts throughout the several views.

While handling depth data with data rates of more than 100 Mbits/s do not pose a challenge in itself, they are problematic in the context of remotely attached or fully mobile sensors. The omnipresent IEEE 802.11a/g WFi standard, for instance, has only an advertised bandwidth of 54 Mbit/s, but under real-world conditions, less than half of this bandwidth is available to the user, with the rest expended on protocol and error correction overheads. While newer standards such as 802.11ac can alleviate this, multiple network attached sensors can still pose a challenge. Transmitting a single depth stream in real-time may, therefore, not be possible using this standard. Furthermore, the sustained data rates needed for capturing depth data may significantly exceed the practical speed of common secure digital (SD) cards. As a consequence, a mobile or remote use of state-of-the-art depth sensors can be challenging. This is also due to the fact that on ultra-low power device 80211a/g is still the technology of choice.

Figure 1B:
Figure 1C:

Similarly, large data storage is needed when hosting depth data repositories such as the depth dataset v2 of NYU (New York University) with close to half a million depth frames and more than 210 GB of depth data. Data compression can alleviate these issues and enable a whole new set of applications as illustrated in FIGS. 1A-1C. A lossless ZLS coder can encode depth data from a wide range of scenes in real-time and to a compression ratio of 8.97:1 on average. Using ZLS, the 498K frames (210 GB) of the NYU depth dataset v2 were compressed at 145 fps on a single workstation core and at 42 fps on an ARM Cortex A9 core to an output size of 23.4 GB. Decoding the data was at least 16% faster than encoding. It is possible to apply ZLS to a variety of applications such as a mobile depth recorder (FIG. 1A) that can be used to scan large indoor scenes conveniently as shown in FIG. 1B. Since it can weigh under 2 kg, the recorder of FIG. 1A can also be mounted to a multi-copter (or flying drone) for airborne acquisition as shown in FIG. 1C.

Depth data compression methods rely either on sub-optimal general purpose compression methods, image-based compression, lossy compression, or non-real-time (offline) compression. In this disclosure, a novel Z-lossless (ZLS) compression scheme for depth streams is presented. Key features of ZLS are ultra-lightweight computational requirements and lossless compression of 9:1 for Kinect™ data. ZLS runs on a single ARM Cortex A9 core clocked at 1.7 GHz at 42 Hz, and outperforms its competitors (such as state-of-the-art general purpose compression, lossless image compression, and lossless video compression) in terms of compression ratio. ZLS utilizes a novel histogram compression module together with a customized predictor-corrector model followed by an entropy coder based on adaptive Golomb codes. ZLS can be used to stream depth data over narrow communication channels or to low-bandwidth storage devices. The presentation demonstrates how ZLS' computational efficiency and high compression ratios on embedded platforms can be used to build a handheld Kinect™ camcorder and a Kinect-equipped hexa-copter, two applications that are not possible with other compression schemes.

A real-time ZLS depth stream compressor for depth data is discussed here. The method is loosely based on a LOCO-I image compression algorithm, an adaptive Golomb-Rice coding and observations from "Low-complexity, near-lossless coding of depth maps from Kinect-like depth cameras" by Mehrotra et al. (Proc. MMSP (2011), pp. 1-6). To the successful (but lossy) compression by Mehrotra et al., the following can be added:

a custom histogram compaction step resulting in the same compressed output size whether input data is given in millimeters or raw measurement bins;
a more sophisticated spatial predictor;
bitplane run-length encoding; and
an improved runlength encoder.

Figure 2:
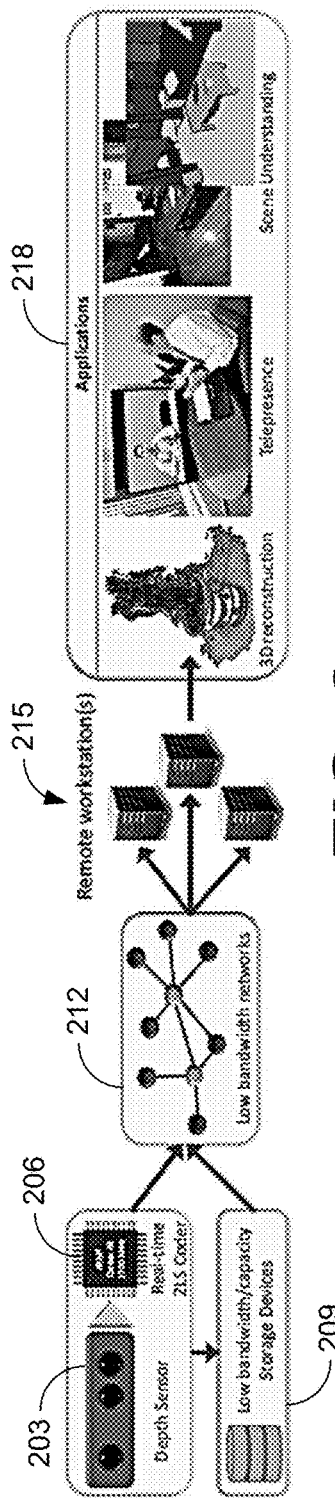

ZLS is able to losslessly compress the large and diverse NYU depth dataset v2 at a compression ratio of 9:1 at more than 145 fps on a single workstation core and at 42 fps on a single ARM Cortex A9 core clocked at 1.7 GHz. Furthermore, ZLS can perform lossy coding with trivial extensions. In consequence, ZLS allows both efficient storage and transmission over narrow communication channels, thereby essentially enabling mobile and remote applications for depth cameras, such as depicted in FIG. 2. Since RGB video compression is a well-established and researched topic, RGB compression is not considered in the following discussion, but standard video codecs are relied upon instead.

As illustrated in FIG. 2, data can be acquired using a depth sensor 203 and is compressed on a low-power mobile CPU 206 in real-time using a ZLS coder. The compressed stream can then be archived on low bandwidth or low capacity storage devices 209, or it can be sent via low bandwidth networks 212 to remote servers and workstations 215. Remotely, applications 218 like 3D reconstruction, telepresence and scene analysis can be performed. The use of the ZLS coder enables separation of data acquisition and processing and allows for mobile sensors 203 to be attached over low bandwidth networks 212 to powerful but stationary computing clusters 215.

Algorithms can allow many applications for Kinect-like depth data (e.g., Kinect™ Fusion, real-time non-rigid pose capturing, shading-based refinement of depth data, and full-body dynamics capturing) to be performed in real-time. Algorithms can also perform reconstructions of the highest quality possible for large scenes, such as global alignment of depth data or color map optimized reconstruction remain a costly offline process. However, even the aforementioned real-time applications typically utilize substantial computational power and either rely on powerful multi-core workstations or GPUs to achieve real-time performance.

The demand for such computational power typically precludes mobile and embedded devices from processing data on-the-fly. However, mobile devices with built-in depth cameras are about to reach the consumer market (e.g., Google's project Tango) or Orbbec's Persee. Due to power considerations, such mobile devices will likely have a significantly decreased measurement range when compared to stationary depth cameras. They are unlikely to provide enough storage to capture large coherent scenes for later offline processing. The mobile devices are also unlikely to provide enough computational power to process depth data in real-time. Therefore, scenarios in which the mobile devices capture depth data and stream it to large compute clusters seem likely.

To enable such scenarios, data compression may be used for efficient compaction of the depth stream. Such compaction can solve both of the aforementioned problems: it can allow for the transmission of depth data over relatively narrow communication channels and it can allow for efficient storage of data. Recognizing that depth data has fundamentally different statistics than regular video data and natural still images, lossy or near-lossless compression techniques can be used to exploit the peculiarities of depth data. For example:

depth data has very little texture;
sharp edges are present at depth discontinuities;
edges separate relatively smooth regions;
data typically comprises a single channel at more than 8 bits; and
only few distinct depth values are found in typical scenes.

These properties make depth data highly compressible. As a result, prior art has proposed preprocessing depth data utilizing common lossy RGB video compression or image-compressors, to use customized compression, or mesh-based compression following triangulation or decomposition of the depth height map. In this context, preprocessing to smooth the data using a median filter is followed by difference computation between adjacent frames. Finally, Google's high-performance LZ4 codec can be used to perform the actual compression.

While all the aforementioned compression methods offer acceptable signal-to-noise ratios and substantial compression ratios, lossy coding may not be acceptable for all scenarios. Such scenarios include large repositories of depth data made available for benchmarking and later dissemination, and data intended to be processed by sensitive reconstruction and scene understanding pipelines.

In contrast to prior methods, a lossless coder for depth data is presented which is named ZLS (Z-lossless). The ZLS coder offers real-time encoding and decoding performance on low-power chips (206 of FIG. 2) such as a single ARM Cortex A9 core clocked at 1.7 GHz. Furthermore, it can be customized to perform lossy coding. The ZLS coding is inspired by the JPEG LS standard, which implements the LOCO-I algorithm, bitplane run-length encoding, and the near-lossless algorithm of Mehrotra et al. As a coding backend, adaptive Golomb codes can be utilized.

Lossy Coding.

To use RGB video compression, the peculiarities of the codecs such as, e.g., H.264 and VM8 should to be worked around. For instance, distributing single channel, 16 bit depth information across three 8 bit color channels in a way that improves quantization resilience has been proposed. To address the computational demands of H.264 in the context of joint-coding RGB+D video streams, candidate motion vectors from the RGB part can be used during depth coding, resulting in a substantial speedup of the encoding and moderate gains in visual fidelity. Depth data can be pre-processed by clipping and companding to 8 bit data that can readily be compressed by H.264. Depending on the target architecture and available hardware acceleration of the video codec in question, methods from this class can achieve real-time performance.

Work on re-using image-based compressors as focused on improving the rate-distortion tradeoff. For instance, a region of interest derived from an edge map of the depth image in combination with reshaping of the depth's dynamic range can be used to change the importance of pixels in lossy JPEG2000 coding. Depending on the targeted image format, methods may achieve real-time performance, although JPEG2000 in particular has a relatively high associated computational cost.

To achieve real-time performance, specialized lossy compression has been proposed. For instance, a Kinect™ Client Server framework and a 3D-TV App can smooth the input depth data using a median filter, followed by difference computation between adjacent frames. Finally, Google's high-performance LZ4 codec can be used to perform the actual compression.

Decomposing the height field corresponding to an 8 bit depth image into a restricted quadtree triangulation can be accomplished by encoding the topology of the resulting zero-tree at 1 bit per vertex. The geometry can be encoded using predictive coding to achieve either lossless 3:1 compression or lossy compression with a wide range of rate-distortion trade-offs. Similar ideas can be followed and parallelize the construction of the quadtree triangulation. A quadtree can be used in which each cell may be decomposed into two platelets using a straight edge to separate two linear components along depth discontinuities. Restricting the location of such edges to boost compression efficiency results in a sparse dyadic mode. The platelet decomposition can be improved upon by allowing arbitrarily-shaped, variability-constrained segments. In this approach, the contours of the segments can be encoded using JBIG whereas the interior can be encoded using linear prediction followed by Huffman coding. In the specialized context of Depth-Image-Based Rendering, pre-computed mesh saliency and depth discontinuity edges can be used to obtain a sparse depth representation. This representation can then be reconstructed using scattered data interpolation. The method assumes that the input scene's geometry is known to pre-compute 3D saliency.

A real-time, near lossless image compression scheme may be utilized for 16 bit depth data. Observing that Kinect-like sensors bin the measured data with quantization bin sizes scaling with depth, they first perform an inverse mapping followed by spatial prediction and an adaptive run-length Golomb-Rice coding. The compression ratio can range from 7:1 to 16:1 relative to 16 bit depth data (1 . . . 2:3 bpp). ZLS can support true lossless compression at bitrates around 1.2 bpp. These gains may be enabled by a novel range compaction algorithm, a better spatial predictor, and the use of one adaptive Golomb-Rice coder per bitplane to adapt to local statistics. Temporal prediction based on a depth error model for the Kinect™ can be added.

Depth maps can also be compressed by resolution-reduction. To this end, color-directed upsampling of the reduced depth map and trilateral filtering may be used, which takes color, depth, and additional video information into consideration. While the aforementioned compression methods offer acceptable signal-to-noise ratios and substantial compression ratios, lossy coding may not be acceptable for all scenarios. Such scenarios include large repositories of depth data made available for benchmarking and later dissemination, compression of synthetic depth images such as z-buffers occurring during rendering, and image-based rendering applications.

Lossless Coding.

Z-buffer compression for the purpose of rendering is the most obvious example in which lossless real-time compression is advantageous. In this context, compressors typically target tile-based compression to a fixed bitrate and may either succeed or fail to achieve compression at this bitrate. A rasterizer (i.e., GPU or software emulation) then tries multiple compressor modules, potentially in parallel, and chooses the compressor successfully achieving the lowest bitrate. If all modules fail, the block can then be stored verbatim. Methods in this class typically assume the input data to be piece-wise planar, an assumption based on the fact that their input data stems from triangle rasterization. Decomposing the input block into piecewise planar segments then allows these segments to be represented at low bitrates: z-buffer compressors commonly target compression ratios ranging from 2:1 to 8:1 for 16, 24, or even 32 bits of input depth data, allowing rasterizers to achieve lossless compression ratios ranging from 2.5:1 to about 4:1 under real-world conditions. Similar in fashion, decomposition of the depth image into arbitrarily-shaped segments of constrained variability and with a minimum descriptor length (MDL) may be utilized. Each segment can then be encoded using a mixture of local predictors followed by arithmetic coding. Although the computation of MDL segments and the use of an arithmetic code are likely to prevent the method from achieving real-time results, the reported compression ratios are among the best lossless ratios reported in the literature.

Using reversible, binary cellular automata, the input depth image can be decomposed into a wavelet-like collection of sub-bands. Slicing the input image into bitplanes, followed by gray-code-based, inter-bitplane prediction, is used to generalize the concept to multi-level (as opposed to binary) images. The resulting, spatially decorrelated data is finally encoded losslessly using an arithmetic coder. The main advantage of using cellular automata instead of a traditional non-linear filter bank is that the decorrelation step can be trivially parallelized. A very similar inter-bitplane prediction can also be used, where inter-frame motion prediction for video streams and context-based adaptive binary arithmetic coding (CABAC) is added to perform lossless compression of 8 bit depth in the context of 3D video coding. This can be used for improving the compressing performance of the CABAC in H.264, which can achieve a 4% gain in compression ratio. It is worth noting that most publications targeting 3D video coding assume only 8 bits of depth, whereas z-buffer compression algorithms address the encoding of at least 16 bits of depth.

In this disclosure, a fast and lossless coder for depth data is presented and which has been termed ZLS (Z-lossless). This coder offers real-time encoding and decoding performance on low power chips such as a single ARM Cortex A9 core clocked at 1.7 GHz. Furthermore, it can be customized to perform lossy coding in a trivial fashion. In addition to offering real-time performance, ZLS is designed to compress depth at up to 32 bits per sample and can be easily adjusted to accommodate even higher bit rates.

Methodology

Figure 3:
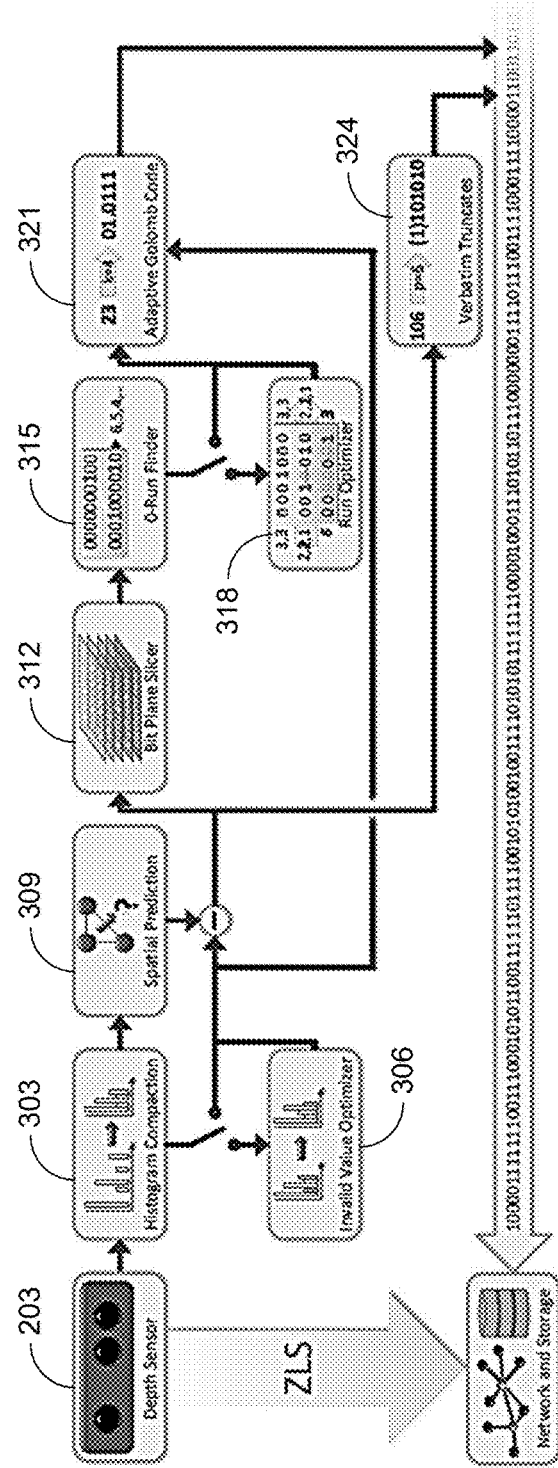

In this section, an overview of the ZLS encoding pipeline as depicted in FIG. 3 will be traversed, step by step, and its modules described. Data from the depth sensor 203 undergoes histogram compaction 303, followed by an optional optimization 306. The compacted image is then fed into a spatial predictor 309, followed by a bitplane slicer 312 and a run length finder 315. Optionally, runs can be further optimized 318. Finally, adaptive Golomb coding 321 can be used as the entropy coding back-end before transmitting the output over networks 212 and/or to storage 215. The overview of the ZLS pipeline is followed by experiments and validation of the method.

As shown in FIG. 3, data from the depth camera 203 first undergoes histogram compaction 303 to densely pack the otherwise sparse range of depth values in each image. The compacted image can then be fed into a spatial prediction stage 309 to remove redundancy from the depth image. The spatial prediction step 309 results in residuals with a geometric distribution. Such residuals can be encoded efficiently by bitplane runlength encoding, comprising a bitplane slicer module 312 and a 0-run finder 315. The bitplane slicer 312 separates each residual into its leading 1-bit and a truncate representing the remainder of the residual's value. The 0-run finder 315 encodes the sparse leading 1-bits in each bitplane, while truncates are stored verbatim 324. Finally, runs are encoded using adaptive Golomb coding 321.

The method offers two profiles, speed and size, where the size profile adds computationally expensive modules of diminishing returns. These modules comprise the optimization module 306 to encode depth values tagged as invalid more efficiently, and the post-optimization 318 for the generated 0-runs.

Figure 4:
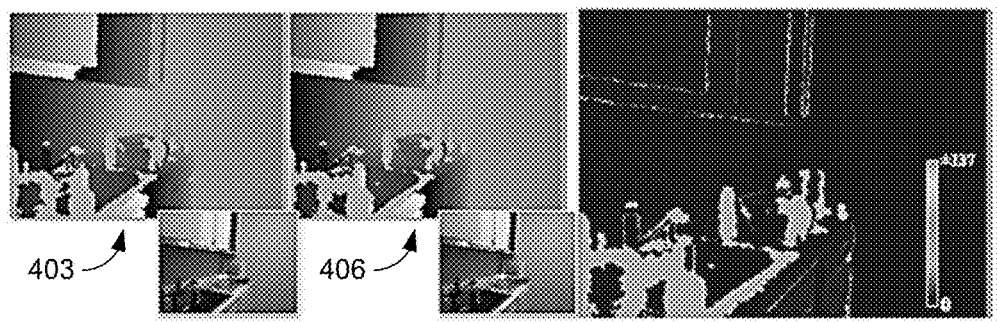

The method, like lossless video compressors (e.g., FFmpeg FFV1), does not perform temporal prediction, except for timestamps. The reason is that temporal prediction typically fails at edges, resulting in cumulative edges that are persistent across frames as shown in FIG. 4. Depicted are two consecutive images 403 and 406 and a color-coded difference magnitude 409. Using temporal prediction results in strong edges stemming from both frames, with the invalid values indicated by the lighter areas. Since most bits are generally allocated to depth discontinuities, temporal prediction is detrimental to lossless coding.

Timestamps. Assume that each depth image is accompanied by a timestamp in milliseconds. A temporal linear prediction can be performed on the current timestamp $t_i$, $$\pi(t_i) := 2t_{i-1} - t_{i-2}, \qquad (1)$$

and $\Delta(t_i) = t_i - \pi(t_i)$ can be encoded using the mapping from signed to unsigned residuals described below and the adaptive Golomb coder 321 (FIG. 3) described below.

Histogram Compaction.

Consider a discrete depth image, $$i: \mathbb{N}_0^2 \to R, R = [r_{min}, \ldots, r_{max}] \subseteq \mathbb{N}_0, \qquad (2)$$

in which each $I_{ij}$ measures in some form the distance between the camera and an object covering pixel ij. Assume I to be locally coherent and sparse in its range R. This assumption is motivated from the observation that in depth maps foreground objects are separated from background objects through a steep edge with range values between foreground and background not or rarely occurring. Further assume that a special value, $r_{invalid}$, may be used to indicate invalid or unreliable measurements in I.

To exploit sparsity, the coding pipeline begins with a histogram compaction 303 (FIG. 3). This step finds a bijection $\phi: R \to R'$ that maps all values occurring in I in an increasing order to a densely packed set $R' = \{1, 2, \ldots\}$. Specifically, an occurrence set can be defined as:

$$H := \{h_n : \exists ij : I_{ij} = h_n\}. \qquad (3)$$

The values in H can then be sorted, yielding a bijection $\phi$ such that $\phi(h_n) = n$ and, intrinsically, $\phi(h_n) < \phi(h_k) \forall n < k$. Then, $\phi$ can be applied to all image values, which typically can greatly lessen the strength of the edges in the depth images. Due to this compaction step, it is possible to achieve exactly the same result independently of whether the input range was specified in millimeters or the Kinect-like raw measurement bins were used. Quantization is not used in this step in order to guarantee lossless encoding.

Referring to FIGS. 5A-5C, shown are perspective renderings of 3D points, color-coded by depth, from a single Kinect™ frame. FIG. 5A shows an input depth image over its histogram; FIG. 5B shows the depth image after reversible histogram compaction over its histogram; and FIG. 5C shows the depth image after reversible optimization performed in size profile over its histogram. Invalid areas of the depth images are shown in gray next to the arrows. The invalid histogram value (indicated by arrows) is sorted to the median of adjacent bins in the last step.

The histogram compaction 303 (FIG. 3) can be implemented efficiently using a hash, or, even better, using a full binary histogram if memory considerations permit. $\phi$ is essentially a perfect and minimal hash of the depth values. To reverse this mapping, $\phi$ itself is stored in the output bit stream.

The previously made assumption of coherent data is supported by the experiments. Typically $\phi$ contains long, piecewise linear runs of values. Therefore, $\phi$ can be encoded by first using a linear predictor, as in Equation (1), to obtain residuals of which many are zero. These residuals are grouped into runs which can then be encoded by the adaptive Golomb coder 321 (FIG. 3). This results in a very compact storage of ϕ. On average, a rate of 0.54 bits per entry was observed with up to 221 entries per frame (NYU3D v2). Bypassing the histogram compaction step results in a 21% increase of the output size for this data set.

Spatial Prediction.

Figure 6:
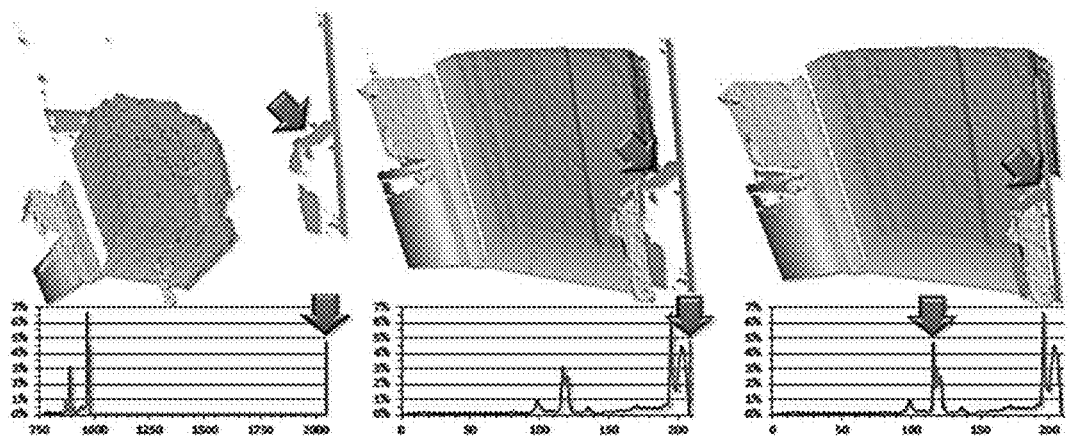

Next is to spatially predict 309 (FIG. 3) the compacted depth image in order to remove redundancies and to exploit coherence. From the wide range of predictors available, consider constant, linear and quadratic options. All of them perform poorly in the presence of edges, resulting in the bulk of bits wasted on incorrectly predicted edges in later stages. This indicates that depth values are best predicted using a non-linear predictor that considers edges explicitly. One such predictor is a Median Edge predictor (MED). The MED uses a heuristic based on the minimum and maximum of immediately neighboring pixels to select one out of three predictors, as depicted in FIG. 6. The heuristic based on maximum and minimum neighboring depth values is used to obtain the prediction π in the presence of axis-aligned edges. If no edges are detected, the MED uses a trapezoid predictor to compute the prediction $\pi_{ij}$:

$$v_{ij}^{min} \leftarrow \min(I_{i-1,j}, I_{i,j-1}) \quad (4)$$

$$v_{ij}^{max} \leftarrow \max(I_{i-1,j}, I_{i,j-1})$$

$$\pi_{ij} := \begin{cases} v_{ij}^{min} & \text{if } I_{i-1,j-1} \geq v_{ij}^{max} \\ v_{ij}^{max} & \text{if } I_{i-1,j-1} \leq v_{ij}^{min} \\ v_{ij}^{min} + v_{ij}^{max} - I_{i-1,j-1} & \text{otherwise} \end{cases}$$

For the large NYU depth dataset v2, the MED outperformed the aforementioned other prediction options and resulted in a 30% compression gain to the next best option, a trapezoid predictor, and in a more than 70% improvement when compared to constant prediction.

Figure 7:
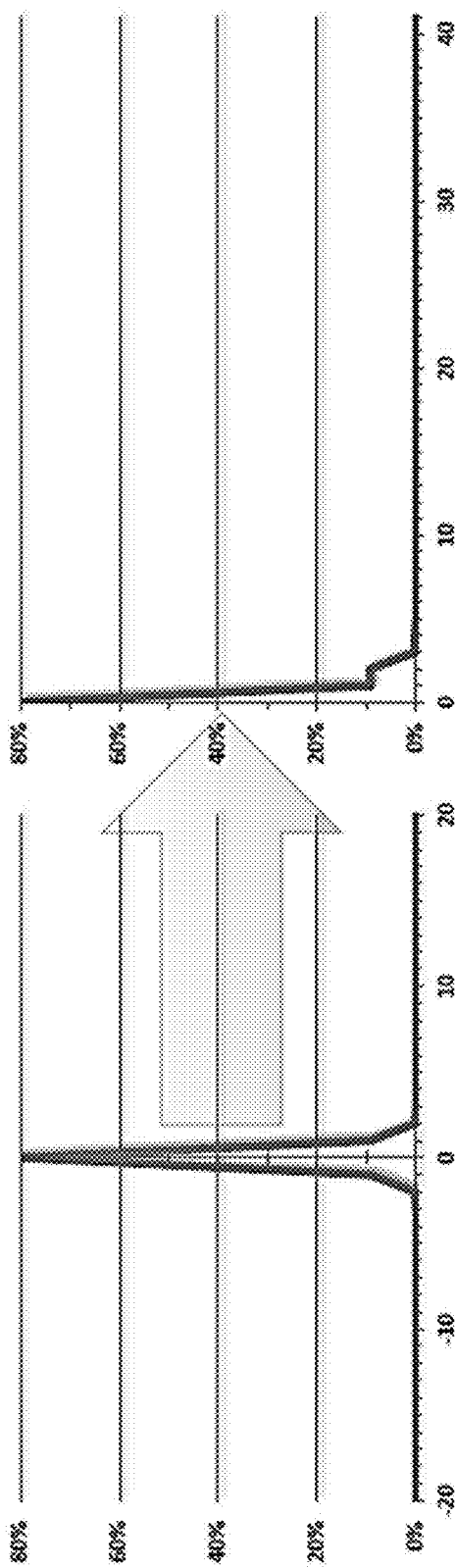

Mapping signed residuals to unsigned residuals. The result of the spatial prediction is an image of signed residuals $\rho_{ij} = I_{ij} - \pi_{ij}$ following a two-sided geometric distribution. FIGS. 7A and 7B illustrate an example of the prediction residuals. FIG. 7A shows the 99% quantile of the signed residuals approximately following a two-sided geometric distribution. To allow for efficient coding using Golomb-Rice codes, a context-aware mapping can be used to map these signed residuals to unsigned residuals that follow a one-sided geometric distribution. FIG. 7B shows the same residuals after mapping them to unsigned integers. Note that 79.3% of all the residuals are zero. For depth values $I_{ij}$ in a range $[r_{min}, r_{max}]$, the naïve range of $\rho_{ij} = I_{ij} - \pi_{ij}$ is $[-r_{max} + r_{min}, r_{max} - r_{min}]$, an interval twice as large as the original range. However, $\pi_{ij}$ is known in the decoding step and $\pi_{ij}$ can be clipped to non-n values since $I_{ij}$ is assumed to be non-negative for all pixel positions ij. Hence, expansion of the dynamic range of $\rho_{ij}$ can be entirely avoided by the following mapping.

$$\rho'_{ij}(I_{ij}, \pi_{ij}) := \begin{cases} -2(I_{ij} - \pi_{ij}) - 1 & \text{if } I_{ij} < \pi_{ij} \\ 2(I_{ij} - \pi_{ij}) & \text{if } \pi \leq I_{ij} < 2\pi_{ij} \\ I_{ij} & \text{otherwise} \end{cases} \quad (5)$$

The resulting image of residuals $\rho_{ij}'$ is then fed to the next stage.

Bitplane Slicer.

In this stage, consider up to 32 bitplanes containing the residuals $\rho_{ij}'$, which was chosen to allow for future extensions. As shown above, the range of $\rho_{ij}'$ equals the input range which is typically 11 bits or 16 bits wide. Each residual can be split into its leading 1-bit and a remainder called a "truncate." Considering, e.g., a binary number of x=101010, its leading 1-bit string is lb(x)=100000. The corresponding truncate is tr(x)=01010, including any leading 0s by definition. A mask of bitplanes can then be computed containing at least one leading 1-bit, $m := \oplus_{ij} \text{lb}(\rho_{ij}')$, where ⊕ denotes a bitwise OR operator. A bitplane p is considered empty if it does not contain any leading 1-bits: $\exists p \in \mathbb{N}_0 : 2^p = \text{lb}(\rho_{ij}') \forall ij$.

If $\exists k : m = 2^k - 1$ (i.e., all bitplanes from 0 to k−1 are occupied), a 1-bit is first stored followed by 5 bits representing k. Otherwise, a 0-bit is emitted to the output bitstream, followed by storing m using 32 bits. The experiments indicate an empirical probability of less than 1% for the latter case.

Figure 8:
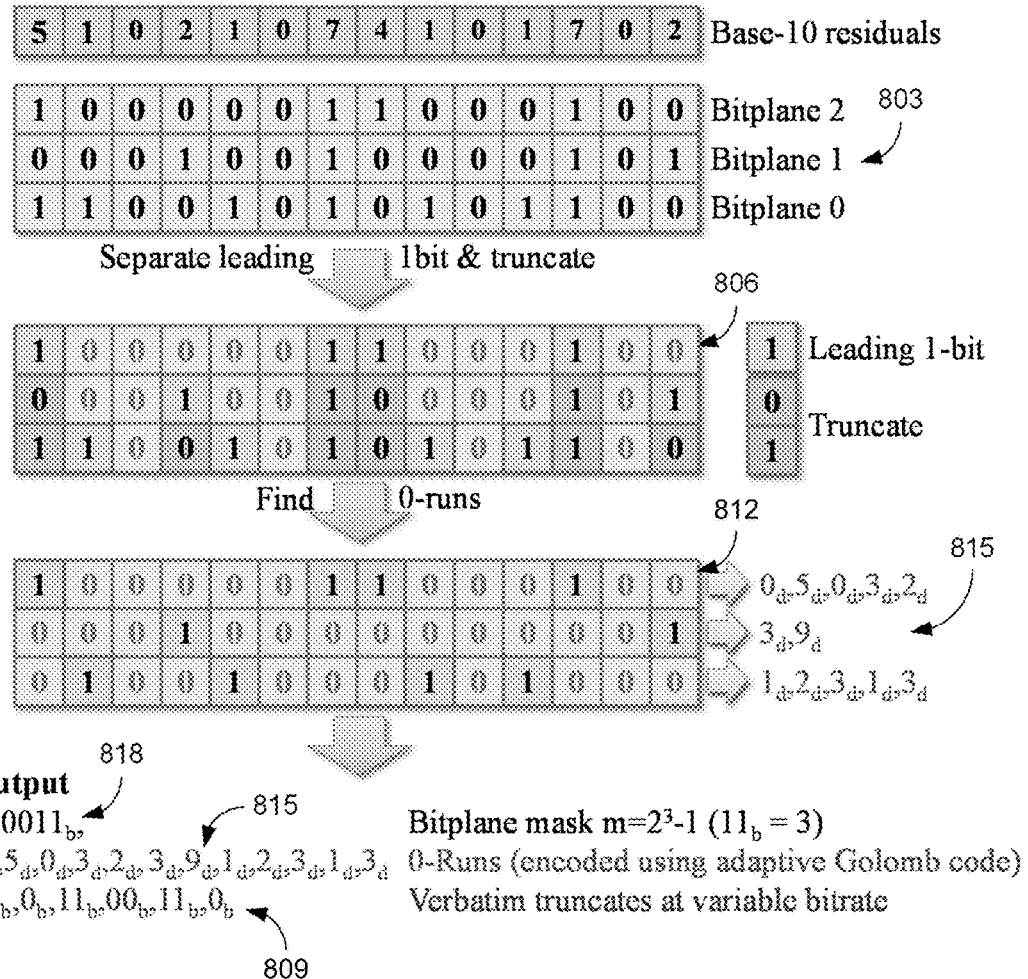

Since the 0-bits and 1-bits in the truncates each occur with a probability of about 0.5 (as observed in the context of floating point compression), truncates are encoded verbatim at $\log_2(\text{lb}(\rho_{ij}'))$ bits. The truncates can then be removed from the residuals, $\rho_{ij}' \leftarrow \rho_{ij}' \otimes \text{tr}(p_{ij}')$, where ⊗ denotes a bitwise XOR operator. As for the full residuals, leading 1-bits follow a geometric distribution. Referring to FIG. 8, shown is an example of bitplane slicing and 0-run finding for 3 bitplanes. Residuals (base-10) are examined in binary representation 803 (e.g., bitplanes 0, 1 and 2). Each residual is split 806 into a leading 1-bit and a truncate. The truncates are stored verbatim 809. Hence, after removing the truncates 812, 1-bits are very sparse in each bitplane, separated by long runs of 0-bits. All non-empty bitplanes are traversed in decreasing order and fed to the 0-run finder.

0-Run Finder.

0-runs 815 between the leading 1-bit are computed for each bitplane of the residuals. Each bitplane can be traversed in scanline order and the occurrence of 0s counted. Each run of 0s is defined to terminate with a single 1-bit. For instance, the string y=10000011000100 of bitplane 2 would result in a 0-run sequence of 0, 5, 0, 3, 2, as shown in FIG. 8. Since the amount of bits in each bitplane is known, encoding the tailing runs of 0s essentially acts as a stop condition for the decoder. The final output stream contains the mask 818 of occupied bitplanes (111b in this example), followed by the adaptive Golomb coded 0-runs 815 and the verbatim truncates 809.

Adaptive Golomb Coding.

Golomb-Rice coding is an optimal generalization of Huffman coding for one-sided geometrically distributed input symbols. FIG. 9A shows an example of the distribution of run-lengths by bitplane of the dining_room_0001 a dataset from NYU3D v2. The run-lengths follow a one-sided geometric distribution (except for the most significant bitplane) with runs longer than 300 occurring predominantly in the higher bitplanes. As can be seen in FIG. 9A, the lengths of the 0-runs extracted by the algorithm follow such a distribution, except for the most significant bitplane. In this plane, a mixture of geometric distributions are observed, as runs occur between several prominent features in the image.

Assume an extremely "unfair" Bernoulli process in which symbol "1" is much more likely than symbol "0". For a 0/1 sequence of such a process, Golomb coding first selects a parameter $M := 2^k$, $k \in \mathbb{N}$ depending on the probabilities for 0 and 1. For each k consecutive 0s in the input stream, a single 1-bit is emitted. If the next k symbols in the sequence contain a 1, a 0-bit is emitted, followed by the next k symbols in verbatim encoding. A more efficient implementation of Golomb coding can be derived by considering runs of consecutive zeros $c_1, c_2, \ldots, c_n \in \mathbb{N}_0$. For symbol $c_i$, compute:

$$q_i := \left\lfloor \frac{c_i}{M} \right\rfloor \quad (6)$$
$$r_i := c_i \bmod M.$$

The Golomb code of $c_i$ then consists of $q_i$ 1-bits followed by a 0-bit and k bits storing $r_i$. This code can be generalized to non power-of-two parameters M.

Classical Golomb-Rice coding suffers from two issues: (a) the statistics of the input need to be known in advance to select an optimal parameter M and (b) due to the discrete nature of M, a coding inefficiency of up to 4.2% was observed. Both issues can be addressed by adaptive Golomb-Rice codes such as Malvar's run-length/Golomb-Rice (RLGR) code that essentially switches between a Golomb-Rice code and a special run mode. The RLGR code learns the statistics of the input source using backward information and is even capable of adapting to sources with nonstationary statistics. However, the run-mode of RLGR represents a computational overhead and an implementational inconvenience. The use of RLGR resulted in a substantial loss in encoding speed offset by very minute compression gains. Therefore, a fast adaptive Golomb-code is used over RLGR that adapts the parameter M on the fly but does not implement RLGR's run-mode. In the experiments, using an adaptive Golomb-code over a stationary code resulted in significant compression gains, which in part can be attributed to the run distribution in the highest bit-plane: a stationary code cannot sufficiently adopt to the mixture of geometric distributions that were observed in many of the data sets.

To update $M=2^k$, k can be represented by a fixpoint representation k' using l fractional bits. The idea is to increase k by $k_+/2^l$ whenever a full run of k 0-bits is encountered and to decrease k by $k_-/2^l$ when a 1-bit is encountered. This method is described in the pseudocode of FIG. 9B. The algorithm of FIG. 9B adapts quickly to the underlying statistical properties of the input data.

In ZLS, one set of parameters l, $k_+$, and $k_-$ can be used for each source with different statistical properties. In particular, one set of parameters is used for the encoding of timestamps, a different set of parameters for the encoding of histogram bins, and another distinct set of parameters for each of the bitplanes. In this fashion, each adaptive Golomb coder can adapt quickly to the statistical properties of one bitplane without interference of other planes with potentially different statistics. Compared to a single adaptive Golomb coder, a substantial gain of encoding performance was observed (up to 5% gain) with only negligible impact on the speed. It is worth noting that all coders in ZLS start with the same set of initial parameters which were tuned experimentally to l:=7, $k_+$:=18, and $k_-$:=20. The initial parameter values were stored only once per ZLS stream.

Optimizations in the Size Profile.

When configured to run in the size profile, ZLS performs more expensive optimizations of diminishing returns. This profile typically takes about one third longer to finish and results in 2% to 4% more compact files. It is intended to be used for archival of data or on faster machines.

Invalid Value Optimization.

Many depth cameras including the Kinect™ tag invalid depth measurements with a special value. Such invalid measurements arise for objects too close to or too far from the camera, at oblique angles and for specular objects. Since this value does not correspond to an actual depth, spatial prediction tends to generate large residuals at the boundary of invalid regions.

To alleviate this problem, each frame can be scanned for boundary pixels of invalid regions during the Histogram Compaction 303 (FIG. 3). Given the bijection ϕ of occupied depth values, the invalid bin, $h_{invalid}$ can be moved to the median position of all neighbors. See, e.g., FIG. 5C. This results in a typical compression gain of 0.6% to 1.0%. Note that this also stores the position $\phi(h_{invalid1}$ explicitly with the rest of the bins $h_i$ in the output stream.

0-Run Optimization.

As illustrated in FIG. 8 and discussed above, the truncates are removed 812 before finding 0-runs in the bitplanes. Many 0s whose presence is implicitly clear from higher bitplanes are encoded. If in a bitplane p and at position ij it is known that the leading 1-bit of $\rho_{ij}'$ has already been encountered (and, thus, encoded) at a higher bitplane q (q>p), position ij can be removed from the run altogether. This step is expensive since it requires tracking leading 1-bits across bitplanes, but it results in a typical compression gain of 1.4% to 3.0%. The example in FIG. 8 would thus generate runs $0_d, 5_d, 0_d, 3_d, 2_d$ (bitplane 2), $2_d, 6_d$ (bitplane 1) and $0_d, 1_d, 1_d, 1_d, 1_d$ (bitplane 0). Since this reduces the dynamic range of the run values, the following adaptive Golomb coder 321 (FIG. 3) can achieve better compression ratios.

Empty Bitplanes.

In the rare event that some bitplane after the first non-empty bitplane is empty (i.e., for the bitplane mask ∃k: $m=2^k-1$), some of its bits are still encoded in the truncates. However, these bits are known to be 0 from the bitplane mask. By removing these bits, the amount of bits allocated to truncates is reduced. This scenario happens for only about 1% of all frames and, consequently, the typical gain with respect to the total data size is only 0.06%. However, since this optimization is cheaper than the two aforementioned ones, it has been kept in the ZLS coder.

Output Stream.

For each frame, the output stream contains the timestamp of the image, a mask indicating non-empty bitplanes, occupied histogram bins, 0-runs and truncates (in that order). The compression methods employed for each type of data and the relative size in the output stream are summarized in the table in FIG. 10. In addition, the output stream stores a minimal header with information about resolution and compression options. ZLS is a purely sequential stream codec and an index has not been added to access individual frames. This can be added akin to a transport stream in traditional video compression.

Decoding.

Decoding trivially traverses the encoding pipeline in opposite order. Since all modules of the encoder are lossless, so is the decoder. Some steps of the ZLS codec have slightly asymmetric performance, resulting in decoding to be slightly faster than encoding. In particular, computing the histogram compaction is more expensive than its inverse, as is finding (and optimizing) the 0-runs.

Figures 10, 11:
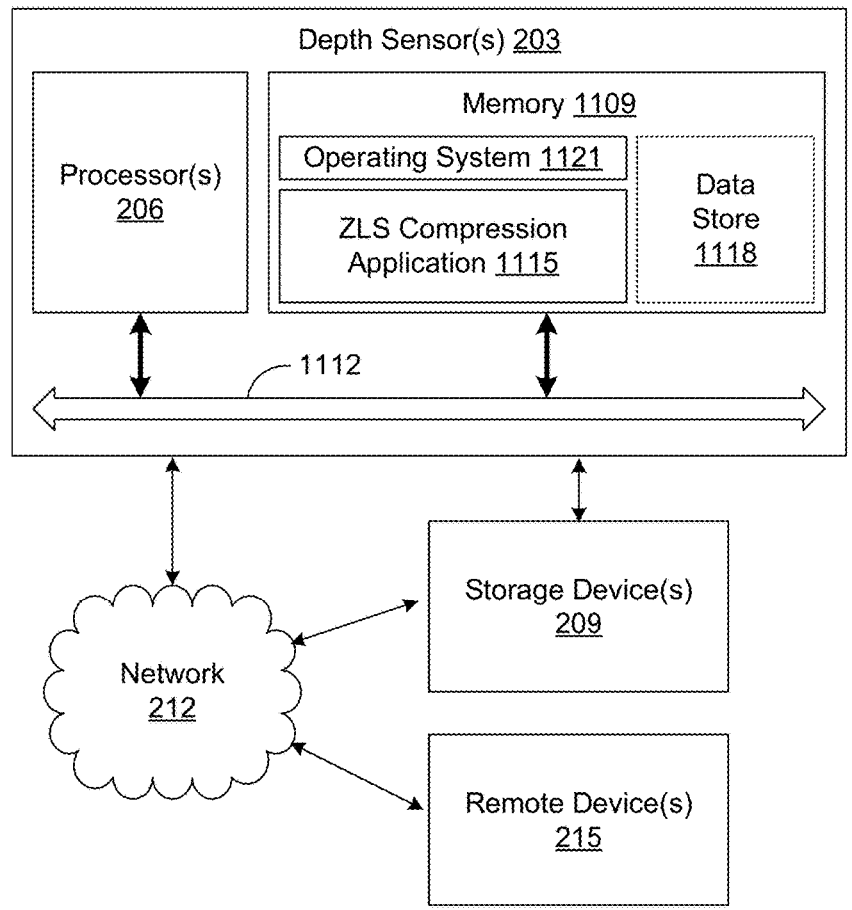

Referring now to FIG. 11, shown is an example of a system that may be utilized in the processing of depth streams. The system includes one or more depth sensor(s) 203 in communication with one or more storage device(s) 209 and/or one or more remote device(s) 215 such as the example in FIG. 2. The depth sensor(s) 203 can include imaging hardware and/or circuitry such as that provided by a depth recorder or other imaging device suitable for capturing the depth data, and processing circuitry for processing the captured depth data. The depth sensor(s) 203 can communicate captured depth data to the storage device(s) 209 and/or the remote device(s) 215 via a network 212. The depth sensor(s) 203 can include a communications interface (or circuitry) that facilitates communication of data via the networks 212.

The depth sensor 203 includes at least one processor circuit (or processing circuitry), for example, having a processor 206 and memory 1109, both of which are coupled to a local interface 1112. To this end, the depth sensor(s) 203 may comprise, for example, a data processing system or any other system providing computing capability. The depth sensor(s) 203 may include, for example, one or more display devices such as liquid crystal display (LCD) screens, gas plasma-based flat panel displays, or other types of display devices, etc. The depth sensor(s) 203 may also include, for example various peripheral devices. In particular, the peripheral devices may include input devices such as, for example, a keyboard, keypad, touch pad, touch screen, microphone, or one or more push buttons, etc. Even though the depth sensor 203 is referred to in the singular, it is understood that a plurality of depth sensors 203 may be employed in the various arrangements as described above. The local interface 1112 may comprise, for example, a data bus with an accompanying address/control bus or other bus structure as can be appreciated.

Stored in the memory 1109 are both data and several components that are executable by the processor 206. In particular, stored in the memory 1109 and executable by the processor 206 include a ZLS compression application 1115 and potentially other applications. Also stored in the memory 1109 may be a data store 1118 and other data. The data stored in the data store 1118, for example, is associated with the operation of the various modules and/or functional entities described here. For example, the data store 1118 may include depth data and other data or information as can be understood. In addition, an operating system 1121 may be stored in the memory 1109 and executable by the processor 206. The data store 1118 may be may be located in a single computing device or may be dispersed among many different devices.

The storage device 209 and remote device 215 are representative of a plurality of devices that may be communicatively coupled to the depth sensor 203 through a network 212 such as, e.g., the Internet, intranets, extranets, wide area networks (WANs), local area networks (LANs), wired networks, wireless networks, or other suitable networks, etc., or any combination of two or more such networks. The storage device 209 and/or remote device 215 may comprise, for example, a processor-based system such as a computer system, server or other system providing computing and/or storage capability. In some embodiments, a storage device 209 may be directly connected to the depth sensor 203.

The components executed on the depth sensor 203 include, for example, the ZLS compression application 1115 and other systems, applications, services, processes, engines, or functionality not discussed in detail herein. The depth sensor 203 can compress captured depth data, utilizing the ZLS compression application 115, and communicate the compressed data to the storage device 209 and/or remote device 215 for storage and/or further processing.

It is understood that there may be other applications that are stored in the memory 1109 and are executable by the processor 206 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 1109 and are executable by the processor 206. In this respect, the term "executable" means a program file that is in a form that can ultimately be run by the processor 206. Examples of executable programs may be, for example, a compiled program that can be translated into machine instructions in a format that can be loaded into a random access portion of the memory 1109 and run by the processor 206, source code that may be expressed in proper format such as object code that is capable of being loaded into a random access portion of the memory 1109 and executed by the processor 206, or source code that may be interpreted by another executable program to generate instructions in a random access portion of the memory 1109 to be executed by the processor 206, etc. An executable program may be stored in any portion or component of the memory 1109 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Also, the processor 206 may represent multiple processors 206 and the memory 1109 may represent multiple memories 1109 that operate in parallel processing circuits, respectively. In such a case, the local interface 1112 may be an appropriate network that facilitates communication between any two of the multiple processors 206, between any processor 206 and any of the memories 1109, or between any two of the memories 1109, etc. The local interface 1112 may comprise additional systems designed to coordinate this communication, including, for example, performing load balancing. The processor 206 may be of electrical or of some other available construction.

Although the ZLS compression application 1115, and other various systems described herein, may be embodied in software or instructions executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Any logic or application described herein, including the ZLS compression application 1115, that comprises software or instructions can be embodied in any non-transitory computer-readable medium for use by or in connection with an instruction execution system such as, for example, a processor 206 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Experimental Results

Comparison with General Purpose Compressors.

The test system was an Intel Xeon E5-2680 2.70 GHz machine with 64 GB of RAM running Windows 7 Professional. A single core was utilized for fair comparison and all data was read from an SSD RAID.

The ZLS compression method was compared with standard general purpose compression tools: the LZ77 based gzip, the LZMA based 7Zip and the Burrows-Wheeler-transform based bzip2. The highly optimized implementations in the 7Zip tool were used for benchmarks. Furthermore, the ZLS compression method was compared with compression tools optimized for compression speed, namely Google's LZ4 and Snappy and Oberhumer's LZO. All compressors but the Snappy compressor come with speed vs. compression ratio tradeoffs. To assess their performance, two runs were performed. In the first run, all compressors were set to optimize for encoding speed, while the second run were optimized for output size. Since LZO provides different methods instead of a compression level, lzo1x_1_15 (speed) and lzo2a_999 (size) were used. Furthermore, Snappy does not offer any way to control the compression ratio.

Figure 12:
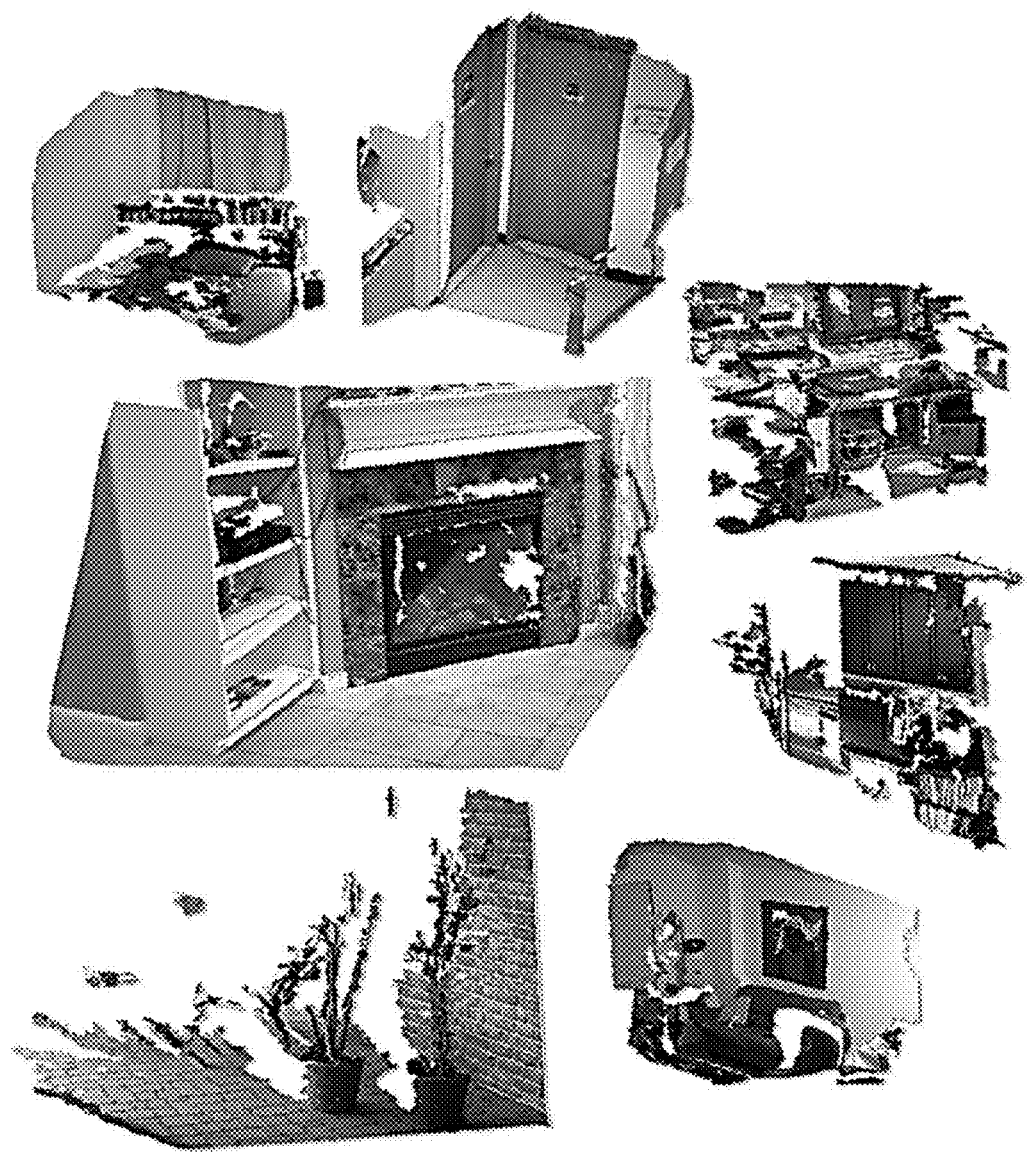
FIG. 12 illustrates examples of single frame 3D point clouds from different categories of the NYU depth dataset v2, in accordance with various embodiments of the present disclosure.

Both runs used Nathan Silverman's NYU depth dataset v2, which comprises 498,297 Kinect™ depth frames taken over about 6 hours (5 hours and 34 minutes) of video capture. This results in an input size of over 210 GB when scaled down from 16 bit raw storage to 11 bits of valid depth range. Broken down into a wide variety of indoor scenes, the data is organized into 19 categories and more than 550 sub-datasets, representing a wide range of scenarios. FIG. 12 shows a selection of single frame 3D point clouds from different categories of the NYU depth dataset v2 demonstrating its large variety of indoor scenes. It should be noted that this dataset contains raw Kinect™ measurement bins ranging from 0 to 2047, where 2047 indicates an invalid measurement. Some frames are incomplete and were removed from the stream. It is also worth noting that some of the sub-datasets were recorded at framerates significantly below 10 Hz, indicating trouble during the acquisition. All frames of each sub-dataset were aggregated into one file by first storing a 64 bit timestamp followed by raw depth data for each frame.

For the first run (speed profile), results are summarized in the table of FIG. 13A, broken down into data categories that compare the ZLS and standard general purpose compressors for the NYU depth dataset v2. Listed are the amount of frames per category, the acquisition time, the input size (assuming storage of 11 bits per pixel) and, for each compressor, the output size in GB as well as the encoding time. All methods optimized for encoding speed. Compressors achieved 145.06 fps (the ZLS), 65.53 fps (gzip), 37.94 fps (7zip) and 13.45 fps (bzip2).

Figures 13B, 14A:
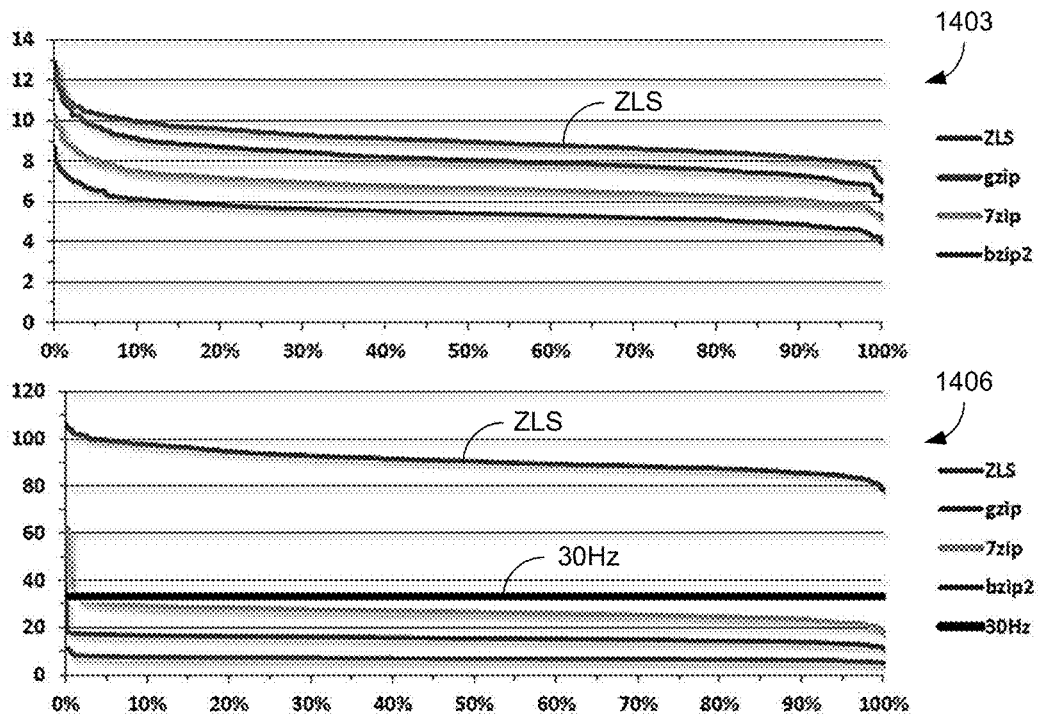

The table in FIG. 13B summarizes the results including LZ4, LZO and Snappy; and provides output size, encoding and decoding time, as well as compression ratio. The compression ratio is defined as input size (packed 11 bits per sample, 210.485 GB) divided by output size. The term average compression ratio is used to refer to the sum of the sizes of input data divided by the sum of the sizes of the output data.

Figure 14B:
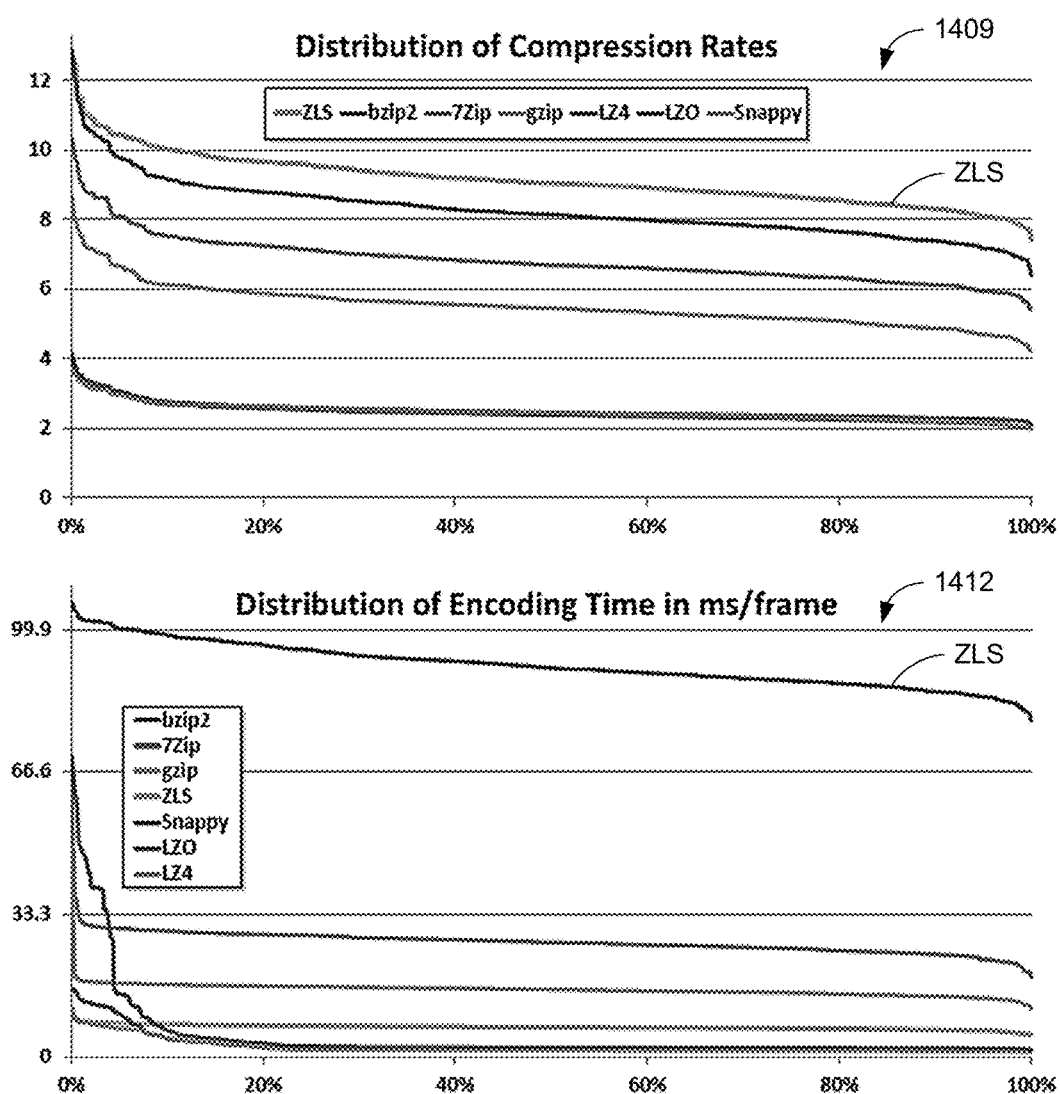

FIG. 14A plots sorted distribution of compression ratios 1403 (top) and encoding times 1406 (bottom) in ms per frame over the percentile of the NYU depth dataset v2. Compression ratios and times of each sub-dataset were sorted decreasingly and plotted over the percentile of the data size. ZLS generally offers the best compression ratio 1403 (top), while being the only option to consistently encode 1406 (bottom) at more than real-time (30 Hz indicated by black bar). FIG. 14B plots sorted distribution of compression ratios 1409 (top) and encoding times 1412 (bottom) in ms per frame over the percentile of the dataset, including LZ4, LZO and Snappy. Compression ratios and times of each sub-dataset are sorted decreasingly and plotted over the percentile of the data size. All compressors were tuned for speed.

This allows us to read a function value (e.g., compression ratio or time) f(x) with the meaning that a fraction x of the data result in higher than or equal values to f while 1−x result in values lower than f. As can be seen, ZLS, LZ4, LZO and Snappy are able to achieve hard real-time (30 Hz), with a small percentage of data requiring more time per frame for the other competitors: gzip, 7Zip and bzip2. Also, ZLS consistently achieves the best compression ratio with 95% of the data compressing to 8:1 or better. The minimum and maximum compression ratios of ZLS were 7.01:1 and 12.59:1 with an average (i.e., total input size divided by total output size) of 8.97:1. This translates to an average data stream of 11.3 Mbit/s. In contrast to other general purpose compression methods capable of achieving hard real-time, this translates into an output that is more than 3.5 times more compact.

For the second run (size profile), results are summarized in the table of FIG. 15, broken down into data categories that compare the ZLS and standard general purpose compressors for the NYU depth dataset v2. Listed are the amount of frames per category, the acquisition time, the input size (assuming storage of 11 bits per pixel) and, for each compressor, the output size in GB as well as the encoding time. All methods were optimized for output size. None of the compared method achieves real-time performance except for ZLS. Note that ZLS' speed profile already outperforms all competitors in terms of compression and speed. Using the size profile, data size can be further reduced from 23.46 GB to 22.95 GB, resulting in a compression ratio of 9.17:1. In this profile, ZLS takes 31% longer (about 1 h15 to compress the full dataset) while the fastest competitor took at least 79 hours to finish.

In summary, ZLS is consistently faster by a good margin and offers higher compression ratios than highly optimized general purpose compressors. The resulting compressed depth stream is small enough to be transmitted over the net 22 Mbit/s bandwidth of WiFi 802.11a/g.

Comparison with Image Compressors.

Performance of the ZLs was also compared with well-established image coders. Due to limitations of most image formats, 16 bpp grayscale images were compressed storing depth values. Notice that the upper 5 bits of each pixel value are 0, a fact that most image compressors utilize to achieve better compression ratios. Experiments were performed on the same workstation described above using standard lossless image formats: Irfanview for Tiff; OpenJPEG for JPEG2000; charLS for JPEG-LS deviL (PNGdevIL) and pngcrush (PNGcrush) for PNG. Note that Tiff and PNG rely on the same compression algorithm, Lempel-Ziv-Welch (LZVV), and result in essentially the same measurements. For the pngcrush, the "-brute" flag was used to enforce exhaustive search for minimum file size. For this experiment, encoding was parallelized on a machine with 16 physical cores to cope with the computational demand, but the total computation time that would have been required on a single core was reported. The table of FIG. 16 provides a comparison between ZLS and the standard lossless image formats. Not all of these tools are reasonably tuned for performance, but the achieved compression ratios are representative and often suffice to make them an unattractive choice for the compression of depth data. In contrast, ZLS consistently offers a compression ratio at least 50% higher than its competition.

ZLS achieves the best compression ratio at fast encoding and decoding speeds. PNG has the potential to achieve the second-highest compression ratios, but the encoding cost to find the optimum encoding parameters on a frame-to-frame basis are prohibitive. While it may be possible to search optimum parameters only sporadically, the encoding speed of un-optimized PNG encoding is still more than 5 times slower than ZLS. Decoding from PNGs, in contrast, is very fast, whereas for the encoding, JPEG LS turned out to be fastest. The reason why ZLS is able to outperform JPEG LS in terms of compression ratio is the histogram compaction step that results in smaller residuals on average during the prediction step. This is further helped by the fact that ZLS uses an adaptive Golomb-Rice coder per bitplane to (a) adapt to the mixture of geometric distributions encountered in the most significant bitplane, and (b) adapt to local variations in each bitplane as caused, e.g., by varying degrees of spatial correlation.

Comparison with Video Codecs.

A comparison with lossless video codecs is a challenging endeavor, since most video codecs either do not support single channel sources or bitrates higher than 8 bits per channel. In the context of lossy codecs, this was recognized in a scheme to distribute 16 bit depth data across the YUV channels of a standard H.264 codec. While the H.264 standard specifies support of up to 14 bits per channel, this is not readily available in existing tools. In particular, FFmpeg, which relies on libx264, supports a maximum of 10 bits per channel in some distributions with a default of 8 bits per channel. This is currently the standard distribution that is bundled with FFmpeg. Whereas the H.264 standard recognizes the need for lossless coding in its Hi444pp profile, and, in particular, the joint-coding of RGB+D video in its Multiview Depth Compression (MVDC) profile, these are currently implemented at 8 bit precision, which limits its use for high range depth coding significantly. While FFmpeg is capable of processing 16 bit grayscale input, such input data is typically converted lossily to a lower bitrate to meet the requirements of the actual codec.

In contrast, FFmpeg FFV1 is an intraframe-only (i.e., not exploiting temporal correlation) lossless video codec that fully supports 16 bit grayscale frames. FFmpeg's implementation of FFV1 was used to compare ZLS. This makes the comparison between ZLS and FFV1 straightforward. To get an idea of the performance of the aforementioned H.264 video codec, two experiments were conducted. In the first experiment, the 11 effective bits of depth from the NYU3D v2 data set were distributed across the three YUV channels before encoding the resulting dataset losslessly using H.264 Hi444pp. The findings of this experiment are summarized in the table of FIG. 17, which provides a comparison between ZLS and FFmpeg FFV1, one of the very few non-trivial lossless video codecs. In the second experiment, only the top 8 bits of the depth stream were used. This resulted in a compression scenario similar to ZLS' 3 bit truncated lossy mode. For H.264, a medium speed preset was chosen. The findings for the second experiment are discussed with ZLS' lossy performance.

Performance on Embedded Systems.

The ZLS encoder was tested on a single core of an ARM Cortex A9 clocked at 1.7 GHz. The test system had 2 GB of RAM and ran Ubuntu 14.04LTS. For data from the NYU depth dataset v2, an average encoding rate of 42.1 fps and a decoding rate of 50.3 fps were observed. For this experiment, the ZLS speed profile was used. Since A9 CPUs typically come in multicore configurations, ample room for other processing tasks is left to the application.

Lossy Compression Modes.

Lossy compression can be achieved by eliminating the least significant bits from the input for all valid measurements prior to compression. This can result in higher compression ratios while still limiting the maximum reconstruction error from above. The implementation provides three lossy modes, in which up to three least-significant bits can be removed. A mid-tread quantizer can be used to facilitate proper rounding of values. Since less bitplanes are compressed, lossy compression can be significantly faster than lossless compression using this method.

The table of FIG. 18 provides a comparison of ZLS' lossless and lossy compression modes for the NYU depth dataset v2, listing the root-mean-square error for valid depth samples only. Experiments were performed using ZLS' speed profile and the number of bits truncated ("lossyness"), the output size, compression ratio, reconstruction rmse, and timings for encoder and decoder are listed. Data is alos provided for FFV1 and H.264 Hi444pp, with input data truncated by 3 bits to include only the 8 most significant bits per pixel. In this data set, 13.62% of all pixels are tagged as invalid. These tags are always encoded losslessly by reserving a special value to represent invalid tags. This value is never truncated. Note that in particular the 1-bit lossy mode is appealing, since its rmse is below one bin. It can therefore be regarded as quasi-lossless considering the inherently noisy depth data. Truncating the 3 least significant depth bits reduces the bitrate to 8 bits per sample. Therefore, the use of lossless H.264 (and FFV1) is trivially possible. In the experiments, both H.264 and FFV1 outperformed ZLS in terms of compression ratio, but not in terms of encoding speed. This may be attributed to the fact that although ZLS' lossy mode may be useful in many scenarios, it is rather simplistic in nature.

For this data set, the errors correspond to peak signal-to-noise ratios (PSNRs) of 69.24 dB (1 bit truncated), 64.46 dB (2 bit truncated), and 58.83 dB (3 bit truncated). In comparison, a lossy encoding of 8 bit depth data was used to achieve a PSNR of 47.19 dB at a compression ratio of 27.42:1, whereas ZLS achieves encoding of 11 bit depth data at a PSNR of 58.83 dB and a compression ratio of 28.96:1. A compressed bitrate of 3.02 bits/sample was achieved for numerically lossless compression and 2.2 bits/sample was achieved for lossless compression up to the sensor accuracy (vs. lossless ZLS at 1.2 bits/sample). A mse of 2.87 at 0.924 bits/sample (vs. ZLS, 1 bit truncated lossy, with a mse of 0.50 at 0.844 bits/sample) was reported.

On a selection of Middlebury ground-truth, 8 bit disparity maps, an average compression ratio of 31.644:1 was achieved. In contrast, ZLS achieved only a ratio of 18.368:1. It is worth noting that while ZLS is optimized for speed, the other method required both a variability constrained MDL segmentation and an arithmetic coder. As a result, that method might be too computationally demanding to run at real-time.

Other Depth Sensors.

The Kinect™ v1 uses structured light for obtaining depth values. A sparse speckle pattern is projected into the scene, from which a DSP first reconstructs sparse depth measurements which are then interpolated to yield a full depth frame. In contrast, sensors such as the Kinect™ v2 or the SoftKinetic sensors use time-of-flight technology. To assess the performance of ZLS for this different measurement modality, a short office scene was recorded using a KinectOne and a SoftKinetic DS311. Both of the following measurements should be taken with a grain of salt, as for these sensors no standardized test suites exist that would allow benchmarking across a wide range of scene types.

Figures 19, 20, 21:
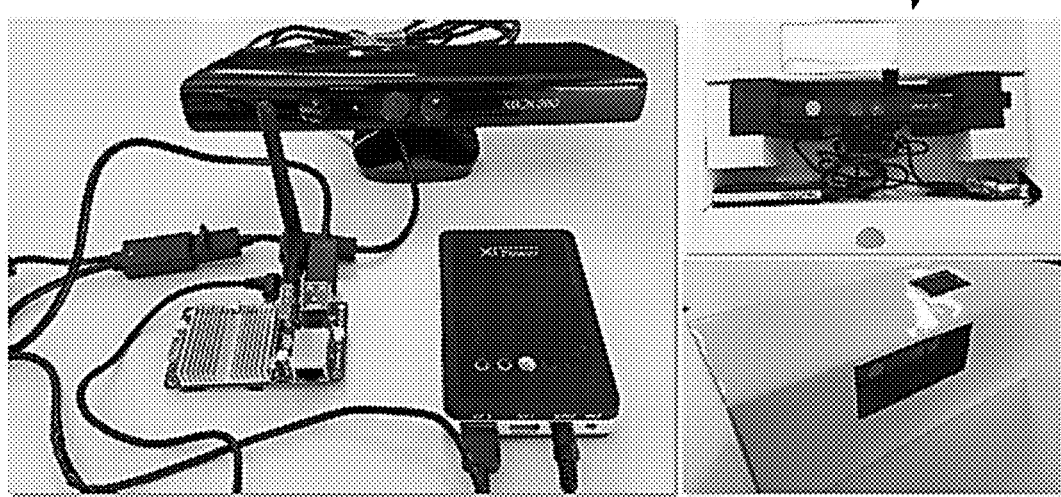
FIGS. 19 and 20 include tables providing comparisons between a ZLS depth sensor and other depth sensors, in accordance with various embodiments of the present disclosure.
FIG. 21 includes images of an example of a mobile Kinect-based depth data recorder, in accordance with various embodiments of the present disclosure.

Kinect v2. The Kinect™ v2 produces 512×424 pixel depth frames at 30 Hz, encoding depth values at 16 bits per pixel. Data for 2,141 frames of an office environment were captured in 72 seconds and then compressed using the aforementioned tools in both speed and size profiles. The table of FIG. 19 provides a comparison of ZLS' compression performance for Kinect™ v2 data. JPEG LS is the strongest competition for the ZLS method, being faster and close in compression to ZLS in size profile. Overall, the compression ratio for the Kinect™ v2 was lower, which may be attributed to the higher depth fidelity of the data, the effectively higher spatial resolution (Kinect™ v1 interpolates sparse measurements), as well as the fact that this scene does not contain any invalid values which would compress relatively well.

SoftKinetic DS311.

The SoftKinetic DS311 produces 160×120 pixel depth frames at 60 Hz, encoding depth values at about 14 bits per pixel. Data for 5,716 frames of an office environment was captured in 95.3 seconds. The table of FIG. 20 provides a comparison of ZLS' compression performance for SoftKinetic DS311 data. JPEG LS was faster than ZLS, but ZLS achieved the overall best compression ratio in size profile. It should be noted that this sensor has a substantial noise level, posing a challenge for all lossless compressors alike.

Applications

Mobile Recorder.

Using the ZLS compression scheme running on an ARM Cortex A9, a mobile Kinect-based depth data recorder was built as shown in FIG. 21. Image 2103 shows a "bill of materials" for the Kinect™ camcorder: an embedded computing platform powered from 5V USB (front left) and running a ZLS-based recording software, a mobile phone backup battery with built-in 12V output (front right) and one Kinect™. A standard cell phone backup battery was used with a built-in 5V-to-12V DC-DC step up converter to provide power for the Kinect™ (12V, 1.08 A). As a computing platform, a board manufactured by Odroid was chosen. This board features the Samsung Exynos 4412 quadcore Cortex A9 CPU and 2 GB of RAM. It can be equipped with micro SD cards or up to 64 GB of eMMC. The board has 16 GB eMMC storage and runs Ubuntu 14.04LTS. Additionally, a USB WFi adapter was used for connectivity. In various embodiments, a depth sensor 203 (FIG. 11) includes the depth recorder and computing platform.

The battery is rated at 37 Wh. It provides enough power to run the setup for over 2 hours of continuous use, with the Kinect™ drawing the bulk of the power. The unit's 11 GB of free space are sufficient to store more than 2 hours of continuous depth data compressed using ZLS if streaming data directly over WiFi is not desired. The recorder's Kinect™ interface can be based on the libfreenect project. Including the Kinect™, all hardware cost less than 300 USD. Image 2106 illustrates packaging the components back into the Kinect™ box and optionally adding a status display to the box as shown in image 2109 results in a package weighing just under 2 kg.

Two tests were performed using the mobile recorder of FIG. 21. In the first test, the recorder was carried through indoor scenes (as shown in FIG. 1B), continuously recording. In 28 min 51s, 51,416 depth frames were recorded at an average framerate of 29.71 Hz and an average bitrate of 7.65 MBit/s, amounting to 1.65 GB of compressed data. The bitrate was lower in this experiment than for the NYU depth dataset v2, since walking along the long corridors of the lab resulted in frames containing more invalid values (about 40% of the data) due to reflections and range limitations. For most of these areas, spatial prediction residuals therefore vanish, resulting in better compression ratios.

Multi-copter or Drone Recorder.

In a second experiment, the mobile recorder was attached to a hexa-copter. The Kinect™ was fixed facing frontwards in a gimble (as shown in FIG. 1B) to stabilize the recordings. The hexa-copter has an available net payload of about 2.2 kg. The Kinect™ recorder took up less than 2 kg of its payload capacity.

Figure 22:
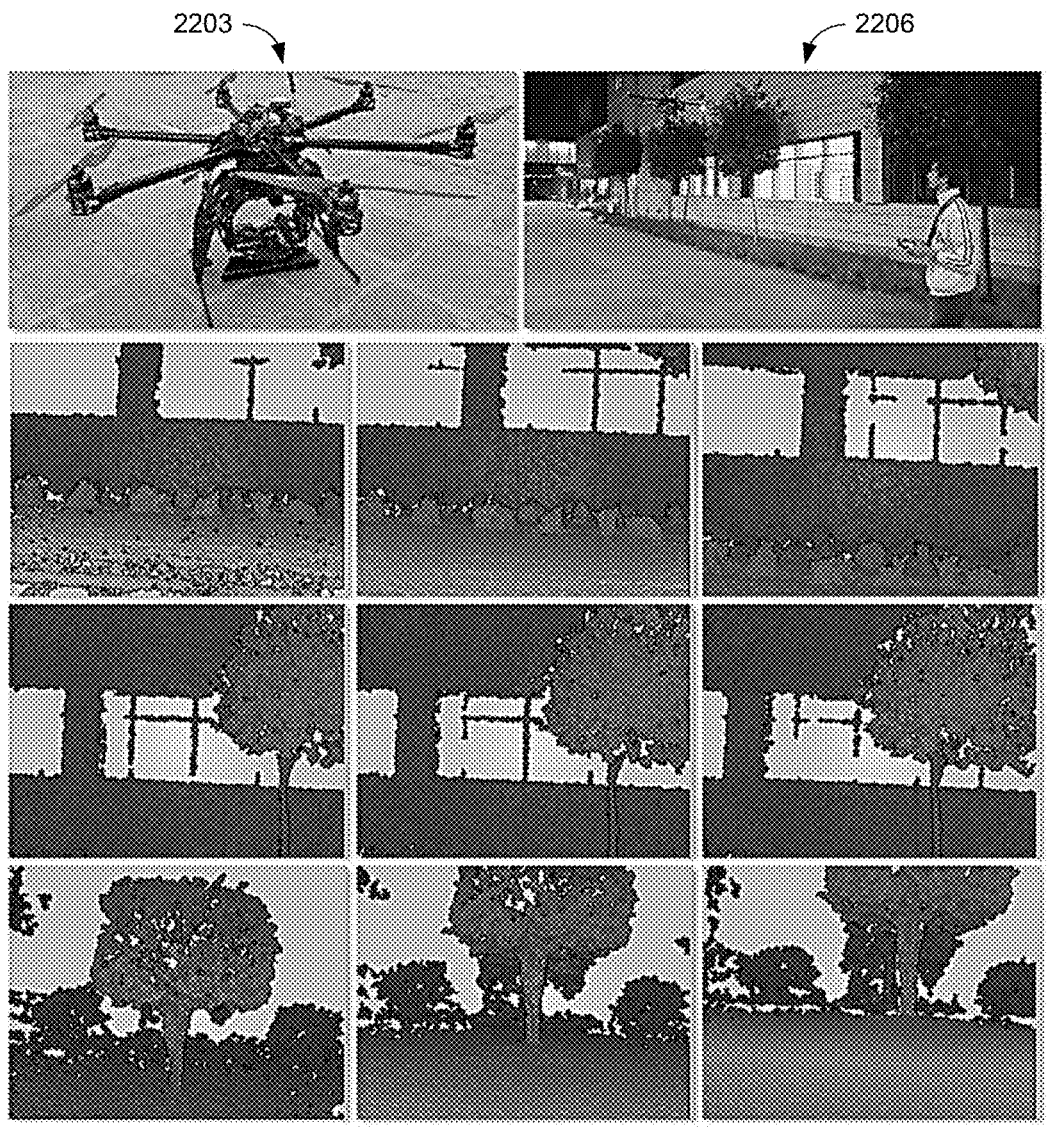
FIG. 22 includes images of the mobile recorder of FIG. 21 mounted to a hexa-copter and depth data captured with the mounted recorder, in accordance with various embodiments of the present disclosure.

The total flight time was 5 minutes after sunset to avoid Kinect's poor performance in direct sunlight. In FIG. 22, image 2203 shows the mobile Kinect™ recorder mounted to the gimble of a hexa-copter. After sunset, to avoid Kinect's poor performance in direct sunlight, about 358.51 MB of compressed depth data of a building façade were acquired in a 5 minute flight as shown in image 2206. In this time, 8,872 frames were recorded at an average framerate of 29.56 Hz and an average bitrate of 9.57 MBit/s, amounting to 358.51 MB of compressed data. The hexa-copter flew at an altitude of 4-6 m along a building, at a distance of approximately 5-6 m. Examples of the captured frames are shown in the bottom three rows of FIG. 22.

While offering a good solution to depth data compression needs, ZLS does not address the encoding of RGB streams that are typically available on consumer class depth cameras. To this end, well-established video compression schemes may be relied upon. It should be noted that the mobile Kinect™ recorder utilizes only one of the four cores available, so that enough computational power for a range of video codecs is available.

One issue of the mobile Kinect™ recorder is its weight, caused by the rather bulky Kinect™. Opening the Kinect™ and removing parts such as its swivel motor may alleviate this problem and will also result in a smaller package. This is mostly of concern when mounting depth sensors on airborne devices with limited payload such as multi-copters: without ZLS and its capability to run on embedded platforms, a laptop has to be typically carried around in addition to the Kinect™, easily topping the 2 kg of the current package.

A ZLS (Z-lossless), lossy-to-lossless compressor for depth data has been presented. It has been shown that ZLS' low computational requirements enable it to perform at real-time on single core embedded CPUs. Moreover, it has been demonstrated that ZLS running on embedded platforms can be used to build mobile depth recorders which can be mounted to airborne devices such as multi-copters. ZLS outperforms a wide range of competing methods in terms of both speed and compression ratio.

The building blocks of ZLS may be utilized to losslessly encode color video. In particular, encoding the raw Bayer pattern images of many consumer class cameras seems appealing, since de-mosaicking results in redundancies that are typically not detected by many image and video compression algorithms. ZLS may also be used in large-scale acquisition of 3D geometry. Multiple mobile and potentially autonomous devices using ZLS can scan different parts of large buildings, while sending data back to a reconstruction cluster in real-time.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about y".

Therefore, at least the following is claimed:

1. A Z-lossless (ZLS) compression method, comprising:
generating compacted depth information $I_{ij}$ by condensing information of a depth image and a compressed binary representation of the depth image using histogram compaction;
applying a spatial prediction to the compacted depth information $I_{ij}$ to generate predictions $\pi_{ij}$;
removing the predictions $\pi_{ij}$ from the compacted depth information $I_{ij}$ to produce a group of residuals $\rho_{ij}'$;
identifying leading 1-bits and truncates in the group of residuals $\rho_{ij}'$ of depth image data, the group of residuals in binary format comprising a plurality of bitplanes;
determining a verbatim truncate series from the truncates identified in the group of residuals; and
determining a 0-run sequence for individual bitplanes of the plurality of bitplanes based upon the leading 1-bits identified in the group of residuals.

2. The ZLS compression method of claim 1, further comprising:
determining a mask of bitplanes for the plurality of bitplanes based upon presence of a leading 1-bit in the individual bitplanes; and
generating an output stream comprising the mask of bitplanes, followed by an encoded version of the 0-run sequence and the verbatim truncate series.

3. The ZLS compression method of claim 2, comprising transmitting the output stream to a low bandwidth or low capacity storage device.

4. The ZLS compression method of claim 2, comprising transmitting the output stream to a remote server or workstation.

5. The ZLS compression method of claim 2, wherein the encoded version of the 0-run sequence is generated utilizing adaptive Golomb encoding.

6. The ZLS compression method of claim 2, wherein individual bits of the mask of bitplanes correspond to one of the individual bitplanes of the plurality of bitplanes, the individual bits indicate whether the corresponding individual bitplane includes a leading 1-bit.

7. The ZLS compression method of claim 1, wherein a first bitplane of the plurality of bitplanes corresponds to a least significant bit of the group of residuals in binary format and a last bitplane of the plurality of bitplanes corresponds to a most significant bit of the group of residuals in binary format.

8. The ZLS compression method of claim 7, comprising converting the group of residuals to the binary format.

9. The ZLS compression method of claim 1, comprising capturing the depth image data with a depth sensor.

10. The ZLS compression method of claim 9, wherein the depth sensor is mounted on a flying drone.

11. The ZLS compression method of claim 10, wherein the flying drone is a multi-copter.

12. The ZLS compression method of claim 11, wherein the multi-copter is a quad-copter or a hexa-copter.

13. An apparatus for real-time lossless compression, comprising:
imaging circuitry configured to capture one or more depth images; and
processing circuitry comprising a processor and memory storing a Z-lossless (ZLS) compression application that, when executed by the processor, causes the processing circuitry to:
generate compacted depth information $I_{ij}$ by condensing information of a captured depth image and a compressed binary representation of the captured depth image using histogram compaction;
apply a spatial prediction to the compacted depth information $I_{ij}$ to generate predictions $\pi_{ij}$;
remove the predictions $\pi_{ij}$ from the compacted depth information $I_{ij}$ to produce a group of residuals $\rho_{ij}'$; and
generate an output stream based upon the group of residuals $\rho_{ij}'$,
wherein generating the compacted depth information comprises:

identifying leading 1-bits and truncates in the group of residuals $\rho_{ij}'$ of depth image data, the group of residuals in binary format comprising a plurality of bitplanes;

determining a verbatim truncate series from the truncates identified in the group of residuals; and determining a 0-run sequence for individual bitplanes of the plurality of bitplanes based upon the leading 1-bits identified in the group of residuals.

14. The system of claim 13, further comprising:

determining a mask of bitplanes for the plurality of bitplanes based upon presence of a leading 1-bit in the individual bitplanes, where the output stream comprises the mask of bitplanes, followed by an encoded version of the 0-run sequence and the verbatim truncate series.

15. The system of claim 14, wherein individual bits of the mask of bitplanes correspond to one of the individual bitplanes of the plurality of bitplanes, the individual bits indicate whether the corresponding individual bitplane includes a leading 1-bit.

16. The system of claim 13, wherein a first bitplane of the plurality of bitplanes corresponds to a least significant bit of the group of residuals in binary format and a last bitplane of the plurality of bitplanes corresponds to a most significant bit of the group of residuals in binary format.

17. The system of claim 13, comprising transmitting the output stream to a remote server or workstation.

18. The system of claim 13, comprising a low bandwidth or low capacity storage device configured to store the output stream.

* * * * *